United States Patent [19]

Yu

[11] Patent Number: 4,847,332

[45] Date of Patent: Jul. 11, 1989

[54] TERMINALLY UNSATURATED MACROMOLECULAR MONOMERS OF POLYFORMALS AND COPOLYMERS THEREOF

[75] Inventor: Simon H. Yu, Westlake, Ohio

[73] Assignee: The B. F. Goodrich Company, Akron, Ohio

[21] Appl. No.: 129,613

[22] Filed: Dec. 7, 1987

[51] Int. Cl.$^4$ .............................................. C08G 83/00
[52] U.S. Cl. ..................................... 525/398; 528/15; 528/29; 528/137; 528/152; 528/232; 528/246; 528/236; 528/237; 528/241; 528/242
[58] Field of Search .......... 525/398; 528/242, 15, 29, 528/137, 152, 232, 246, 236, 237, 241

[56] References Cited

U.S. PATENT DOCUMENTS

| | | | |
|---|---|---|---|
| 3,595,812 | 7/1971 | Bolton | 260/2 |
| 3,652,465 | 3/1972 | Takakura | 260/2 BP |
| 3,848,020 | 11/1974 | Burg | 260/823 |
| 3,883,450 | 5/1975 | Burg | 260/2 R |

*Primary Examiner*—Maurice J. Welsh
*Attorney, Agent, or Firm*—Alfred D. Lobo; Nestor W. Shust

[57] ABSTRACT

Cyclic formals, other than trioxane, form macromers with an olefinically unsaturated alcohol which functions as a propagating species to form a macromer of polyformal having a molecular weight generally less than about 10,000. A cationically ring-openable ether may be used to provide a polyether spacer in the alkenyl alcohol so that the macromer of polyformal formed contains a polyether block. Thus, the polyformal macromer may have a acryloyl, allyl, or styryl head group. Macromers of polyformal block copolymers are formed sequentially by first forming the block of first formal and then without isolating the macromer so formed, sequentially polymerizing a second formal monomer to form the second formal block. A macromer of random copolymer may be formed with one or more cyclic formals or a cyclic ether. Macromers of random copolymers may also be formed with formaldehyde or trioxane. After a macromer of polyformal is formed, it may be isolated and used as a propagating species to provide a block copolymer with a polyether or with another formal. A macromer of polyformal may also be used to copolymerize an olefinic monomer to yield comb or graft copolymers in which the macromer chains are pendant. An end-capped macromer of polyformal may be used to form nonhydrolyzable formal-siloxane block copolymers.

51 Claims, No Drawings

TERMINALLY UNSATURATED MACROMOLECULAR MONOMERS OF POLYFORMALS AND COPOLYMERS THEREOF

BACKGROUND OF THE INVENTION

This invention relates to macromolecular monomers ("macromers" for brevity) of polyformals having a styryl, allyl, or acryloyl "head" (individually and collectively referred to herein as "vinyl functional") group at one end, and a terminal hydroxyl (OH) group at the other end. The term "polyformal" is used herein to refer, both, to homopolymers and copolymers. In copolymers, at least one of the monomers is an oxacyclic compound having a hetero ring containing two or more oxygen atoms, in which ring there is at most two substituted ring C atoms, and the 2-carbon atom, which is connected on each side to an O (oxygen) atom, is unsubstituted. The hetero ring is most preferably relatively small, having from 5 to 9 ring members, but may have as many as about 15 members if there are no more than 6 methylene $-(CH_2)-$ groups in an alkylene chain, and the remaining members are ethylene oxide $-(CH_2CH_2O)-$-repeating units. Polyformals of this invention are characterized as having at least two recurring units of a ring-opened oxacyclic monomer containing an oxymethyleneoxy $-(OCH_2O)-$ group. In this process, 1,3,5-trioxane does not form a useful polymer by itself, though it may be used as a comonomer to form copolymers with macromers of this invention, hence is not a cyclic formal as defined herein.

One of the major interests in the macromers of this invention is related to their being hydrophilic. They are at least partially water-soluble, that is, soluble in water in at least 5 parts by weight per 100 parts of water. The only commercially available water-soluble macromer is a low mol wt polyethylene oxide sold under the tradename Alcolac Sipomer® HEM-5, or HEM-10, the numbers indicating the average number of repeating units in a molecule. The choice of relatively small cyclic formals came about because it was expected that a polymer of such a compound would be water-soluble. Because those macromers derived from cyclic formals having more than 9 ring members with an alkylene chain having more than 6 methylene grorups, do not generally provide such hydrophilicity, they are of minor interest.

The polyformal macromer may be used to initiate block copolymerization with a ring-openable epoxide or gylcidyl ether, or with another cyclic formal monomer, to form a new macromer of block copolymer of cyclic formal-ether or cyclic formal-cyclic formal, respectively. Also, the polyformal macromer is copolymerizable through its head group with an olefinically unsaturated copolymerizable monomer. The copolymerization of the macromer with one or more conventional olefinic monomers generates a "polymacromer" with a hydrocarbon backbone having polyformal branches thus resulting in a graft or comb copolymer.

Conventional methods for the synthesis of graft copolymers primarily rely on polymerizing a monomer in the presence of a polymer which provides the backbone of the graft copolymer. However, neither the number of pendant chains, nor their length can be controlled, and the graft copolymer is contaminated with ungrafted polymer and homopolymers which should have been pendant chains. Moreover, conventional graft copolymerization is susceptible to generation of crosslinked chains.

The process of making the graft copolymer of macromer of this invention permits controlling (a) its predetermined molecular weight (mol wt) as well as the mol wt distribution of the pendant chains; (b) the balance of hydrophobic and hydrophilic properties, (c) the balance of its elastomeric and plastic properties. (d) its glass transition temperature (Tg), and the like, by tailoring the macromer. Most important is that this invention provides a unique process for designing copolymers of a cyclic formal and ethylenically unsaturated monomer. There is no satisfactory way of copolymerizing these monomers because of the difference in functionality between a cyclic formal and an ethylenically unsaturated monomer.

The macromer is formed in commercially acceptable yield by the cationic ring-opening polymerization of a cyclic formal in conjunction with (a) an alkenyl alcohol which functions as the generator of the propagating species, and (b) a cationic ring-opening catalyst such as an oxonium salt, or etherate of boron trifluoride. The alkenyl alcohol (referred to as the "propagator", because it functions as the 'propagating species (OH group) generator' in the presence of a cationic initiator), if substituted, may have substituents which do not interfere with the initiation, propagation and transfer reactions which generate the macromer in a polymerization which has the characteristics of a living polymerization.

The macromer of this invention is formed by a onestep process which incorporates a vinyl functional head into the macromer during polymerization. An alkenyl alcohol functions as a propagating species, that is, the polymer chain propagates from the OH group of the alkenyl alcohol via polyaddition of a cyclic formal. As a result, each alkenyl alcohol molecule generates a polymer chain, and each such chain possesses the vinyl functional head group of the alcohol. This clearly distinguishes my process from conventional processes for preparation of a macromer in which processes a vinyl head group is incorporated after a polymer is preformed, via coupling reactions.

The textbook teaching is that polymerization of trioxane occurs by a direct initiation mechanism, which is proposed based on the experimental fact that the addition of a cocatalyst such as water is neither necessary nor useful. (see *Kinetics and Mechanisms of Polymerization,* by Frisch, K. C. and Reegan, S. L., Vol 2, Ring-Opening Polymerization, chapter titled "Cyclic Formals" by Furukawa and Tada pp 175, Marcel Dekker, 1969). They stated this was quite opposite to the case of cationic vinyl polymerization with a metal halide catalyst which itself has little activity without a cocatalyst like alcohol or water.

U.S. Pat. No. 3,652,465 to Takakura also teaches the use of water or alcohol in the reaction system must be avoided.

U.S. Pat. No. 3,595,812 to Kendall teaches the use of a carbonium or oxonium hexafluorophosphate catalyst for cyclic ethers, N-arylamino compounds, aromatic vinyl compounds and alkenes, particularly the 5-membered heterocycles containing 1 or 2 oxygen hetero atoms. The reaction is also preferably carried out under anhydrous conditions in the absence of a chain transfer or terminating agent, e.g. water, alcohols and amines.

Numerous other references teach the homopolymerization of formaldehyde, and of trioxane, and the copolymerization of trioxane with various cyclic ethers, for example, as taught in U.S. Pat. Nos. 2,951,059; 3,413,270; 3,883,450; 3,848,020; the '465 patent, and the like. U.S. Pat. No. 3,017,389 teaches the use of a small quantity of water, alcohol, and other compounds chain transfer agents for the polymerization of formaldehyde to control its mol wt. The implication was that the alcohol did not end up as part of the polymer chain.

In addition, the foregoing references were concerned with making a relatively high mol wt polymer for molding applications. Particularly with trioxane and its copolymers, they were produced with high mol wt, greater thana 100,000, for use as molding compounds which are highly insoluble in water, not to mention many commonly available solvents. Because, when alcohol was used is such polymerizations, it was used in very small quantity, it appeared likely that a large quantity of alcohol might terminate the polymerization, not participate in such a way as to provide a single terminal group at the head of a relatively low mol wt macromonomer, that is, one having a number average mol wt of less than about 100,000, and preferably less than 30,000. But no prediction could be made as to whether the polymerization would proceed without undesirable side reactions.

Thus, one would not expect a relatively large amount of alcohol to produce any especially beneficial results, particularly with respect to the formation of a macromer of controllable mol wt.

It should be recognized that, in copending patent applications Ser. Nos. 771,093 and 796,634, I have obtained allyl terminated, and styryl terminated macromers of polyethers by the cationic ring-opening polymerization of ethers using allyl alcohol and styryl alcohol, respectively, as the propagators, in a reaction involving the cationic ring-opening of an ether. However, there was little reason to assume the reaction would be effective in the polymerization of cyclic formals, which, because of the two hetero atoms, do not polymerize in a manner analogous to common ethers such as epichlorohydrin or ethylene oxide. Nor is there any known basis for predicting the properties which copolymerization of vinyl-functional polyformal macromers with olefinic monomers might contribute to copolymers formed with them. Nor was there any reason to believe catalysts taught by the prior art references to produce high mol wt polymers could also be used to make low mol wt macromers, some catalysts, such as oxonium salts, or etherate of $BF_3$ being much more effective than others.

Particularly taught in U.S. Pat. No. 3,595,812 is that carbonium and oxonium hexafluorophosphate compounds which are catalysts for cyclic formals, are also catalysts for alkenes, so that, one who might consider the use of an ethylenically unsaturated alcohol as a modifier to prepare a polyformal macromer with terminal ethylenic unsaturation, would likely assume that the double bond would not survive conditions of cationic ring-opening. The fact that the double bond remains in tact, and the alkenyl alcohol still remains an effective propagator, though the reason for each observation is not clear, is one of the bases of this invention. I hypothesize that the presence of the hydroxyl (OH) groups might impair carbocationic polymerization of the ethylenically unsaturated groups.

It is to be noted that the macromers of this invention are formed by cationic ring-opening and not carbocationic polymerization, though both are classified as cationic polymerizations and may even use the same cationic initiator. The cationic ring-opening involves the opening of strained rings of cyclic monomers and the propagating species is an oxonium, sulfonium or ammonium ion; carbocationic polymerization involves substituted olefinic monomers where the propagating species is a carbenium ion.

With the emphasis on the essentiality of the OH propagating sites, the possibility that a vinyl group, and more specifically, an acryloyl, allyl, or styryl end group might survive the conditions of cationic ring-opening polymerization simply escaped notice. In view of the large number of olefinically unsaturated monomers which undergo polymerization (see the list in *Carbocationic Polymerization* by Kennedy, J. P. and Marechal, E., Table 3.6, pp 37 et seq., John Wiley & Sons 1982) the fate of the double bond of the propagator under such conditions seemed speculative. It is of particular commercial importance that the catalysts used herein produce the macromers of this invention in excellent yields generally above 80%, and usually at least 50%. Even among alkenyl alcohols, some vinyl headed alcohols will not survive under my conditions of cationic polymerization. For example, the ethylenically unsaturated group, such as 2-hydroxyethyl vinyl ether ($CH_2=CHOCH_2CH_2OH$), or, 4-hydroxybutyl vinyl ether, is an ineffective propagator. The vinyl ether group of the alkenyl alcohol does not survive under the conditions of cationic ring-opening polymerization of dioxolane and undergo carbocationic polymerization. As a result, the dioxolane polymers do not have an ethylenically unsaturated head group.

In addition to the carbocationic polymerization of the ethylenically unsaturated groups, there are two side reactions associated with cationic ring-opening polymerization of formals which appeared likely to vitiate the formation of the macromers of this invention. These side reactions are the hydride shift and transacetylization processes described by K. Weissermel et al in "Polymerization of Trioxane" *Agnew. Chem. Intl. Ed.*, 6, 526–533 (1967).

Numerous catalysts are disclosed as being useful in ring-opening polymerizations, but there is no indication as to which might be used to provide a relatively low mol wt, nor is there any suggestion as to how to carry out the polymerization in the presence of an ethylenically unsaturated propagator so as to preserve the double bond. Though Takakura states that catalysts such as $HClO_4$, $BF_3$, $FeCl_3$ and $SnCl_4$ produce poly(1,3-dioxolane) ("poly(DOL)") ranging from liquid to solid, colored, low mol wt polymers, with too low activity to be considered satisfactory for practical, commercial use (see for example U.S. Pat. No. 3,652,465 to Takakura, col 1, lines 35–45), I find this is not generally so. For example, I find $BF_3$ gives excellent results. Many other commonly available Lewis acid cationic ring-opening catalysts provide reasonably good results, though some are better than others.

From a study of the foregoing prior art, I concluded that there was no suggestion as to the role of a vinyl functional alcohol as a propagating species for the cationic ring-opening polymerization of cyclic formals; nor, that the vinyl head might survive conditions of cationic ring-opening polymerization; nor, that potential side reactions, hydride shift and transacetylation, would not vitiate the formation of the macromer; and, that the effect of a relatively large quantity of alcohol could not be predicted.

SUMMARY OF THE INVENTION

It has been discovered that, under particular conditions, a cationic ring-opening polymerization of a cyclic formal in conjunction with an alcohol having a vinyl head group, and, an oxonium salt or etherate of boron trifluoride as the cationic ring-opening catalyst, produces a polyformal macromer which has a vinyl functional head group at one end and a hydroxyl (OH) group at the other. The vinyl functional group of the alcohol does not undergo carbocationic polymerization under the acidic conditions required for the cationic ring-opening polymerization of the cyclic formal used. The polymerization proceeds by polyaddition of the cyclic formal to the OH group which is the propagating species, hence the alcohol is referred to as the 'propagator'.

It is therefore a general object of this invention to provide a process for the manufacture of a polyformal macromer having a vinyl functional head group and a hydroxyl group at the tail, comprising, polymerizing (A) a cationically ring-openable cyclic formal monomer having the structure

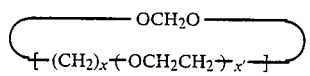 (M)

wherein, x is an integer in the range from 2 to 6;

x' is in the range from 1 to 3; and, no more than two ring C atoms, other than the 2-carbon atom, may have a single substituent selected from halogen, and lower alkyl, haloalkyl, and alkoxy each $C_1$-$C_5$; said cyclic formal alone, or with a comonomer selected from the group consisting of (i) formaldehyde, (ii) 1,3,5-trioxane, and (iii) a cationically ring-openable ether; and, (B) a primary or secondary alcohol R-OH having a terminal vinyl group, said alcohol being selected from the group consisting of (a) an acryloyl alcohol wherein the vinyl unsaturation is adjacent a carbonyl group as in the structure $$\begin{array}{c} R^1 \quad O \\ | \quad \| \\ CH_2=C-CO-R^2-G-OH \end{array} \quad (1)$$

wherein, $R_1$ is H or $C_1$-$C_{20}$ alkyl, preferably lower $C_1$-$C_5$ alkyl, and most preferably methyl;

$R^2$ is selected from a saturated group consisting of branched or linear alkylene, haloalkylene, alkoxylene, haloalkoxylene, each $C_1$-$C_{20}$, aralkylene, haloaralkylene, aralkoxylene, and haloaralkoxylene, each $C_7$-$C_{20}$; and, G, when present, is a polyether spacer having a number average molecular weight Mn from about 100 to about 10,000, and when absent, is replaced with a bond connecting $R^2$ to OH;

(b) a styrylically unsaturated primary or secondary alcohol wherein the ethylenic unsaturation is adjacent to an aromatic ring, represented by the structure

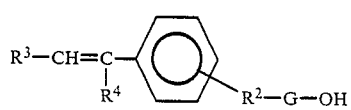 (2)

wherein, $R^2$ and G, if either is present, is in an ortho-, meta-, or para- position of the phenyl ring which may be substituted, said position being relative to that of the olefinically unsaturated group; when both $R^2$ and G are absent, they are replaced with a bond connecting the OH group to the ring; and, $R^3$ and $R^4$ are selected from the group consisting of hydrogen, $C_1$-$C_{10}$ alkyl and haloalkyl, and, at least one of $R^3$ and $R^4$ is always H; most preferably, both are H, or, if one is H, the other is $CH_3$;

(c) an allylically unsaturated primary or secondary alcohol wherein the ethylenic unsaturation is adjacent to a saturated carbon atom, represented by the aliphatic structure

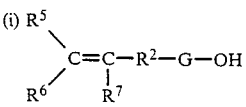 (3)

wherein only G is optionally present; and, by the alicyclic structure

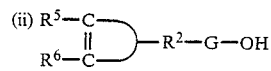 (4)

wherein, the olefin bond is part of the ring which may be a single or fused ring structure having from 5 to 10 ring carbon atoms, both $R^2$ and G are optionally present; that is, when both are absent, they are replaced with a bond directly connecting the OH group to the ring; and, $R^5$, $R^6$ and $R^7$ are independently selected from the group consisting of hydrogen, $C_1$-$C_{20}$ alkyl and haloalkyl, and, $C_6$-$C_{20}$ aryl and aralkyl;

in the presence of an effective amount of (C) a cationic initiator selected from the group consisting of Friedel-Crafts acids, relatively strong protic organic and inorganic acids, oxonium salts and stable carbenium ions;

so as to produce a polyformal macromer represented by the structure $$R—(M)_m—OH \quad (FM)$$

wherein, R represents the residue of said alcohol (B), [(a), (b) or (c)] having a vinyl group, the structure of the macromer (FM) being written to emphasize the terminal OH group, the O atom for which is from the last repeating unit of (PolyM), this structure also being written as (PolyForm) for immediate recognition, M represents a repeating unit of a polymeric chain in a homo-, block or random copolymer of cyclic formal containing at least 25% by wt of the repeating unit of at least one said cyclic formal (M) which is ring-opened, and, m represents an integer in the range from 2 to about 500, more preferably from 2 to about 300.

Specific embodiments of macromer (FM) may be written, (i)

$$R—(PolyM1)—OH \text{ or } R—(PolyForm 1)—OH \quad (5)$$

when only one said formal monomer is used to form a macromer of homopolymer;

(ii)

$$R-Poly[(M1)-r-(M2)]-OH \qquad (6)$$

when two formal monomers M1 and M2 are used to form a macromer of random copolymer; and, (iii)

$$R-Poly[(M1)-r-(X)]-OH \qquad (7)$$

when a formal monomer M1 and X which represents cyclic ether, trioxane or formaldehyde, are used to form a macromer of random copolymer containing formal repeating units; the structures of the macromers of random copolymers are also written $$R-Poly(Form1-r-Form2)-OH \qquad (7a)$$

$$R-Poly(Form1-r-Et)-OH \qquad (7b)$$

$$R-Poly(Form1-r-TOX)-OH \qquad (7c)$$

and, (iv)

$$R-(PolyM1)-b-(PolyM2)-OH \qquad (8)$$

$$\text{or, } R-(PolyForm1)-b-(PolyForm2)-OH \qquad (8a)$$

$$\text{also, } R-(PolyForm1)-b-(PolyEt)-OH \qquad (8b)$$

when two said formal monomers M1 and M2, or a formal monomer M1 and a cyclic ether Et, are used to form a macromer of block polyformals by sequential additions of formal monomers, or, of a formal monomer and a comonomer.

When G is present as (PolyEt), that is, derived from a polyether, the resulting macromer is a block copolymer, polyether-b-polyformal having the structure $$R'-(PolyEt)-b-(PolyM)-OH \qquad (9)$$

wherein $R' = R-G$, because G is included in R.

It is a specific object of this invention to provide an essentially linear macromer (i) of polyformal homopolymer; (ii) of ether-formal block copolymer when a polyether (PolyEt) spacer is present in the vinyl-headed alcohol; (iii) of a random copolymer of first and second cyclic formals, or, of the first cyclic formal and cyclic ether, or trioxane, or formaldehyde; and, (iv) a block copolymer of formal-formal or formal-ether by sequential additions of formal and a comonomer; so that in each case, the linear macromer has a vinyl (acryloyl, styryl, or allyl) group at one (head) end and a OH group at the other (tail) end of its polymer chain, and the macromer has substantially uniform weight distribution such that its ratio of Mw/Mn is not more than 5.0.

After formation of any one of the macromers, it is also a specific object to use one in a new process to form novel block copolymers containing a block of an oxirane or glycidyl ether, these block copolymers having the structure $$R-(M)_m-b-(PolyEt)-OH \qquad (10)$$

$$\text{or, } R-(PolyM)-b-(PolyEt)-OH$$

in which the block $(M)_m$ may have any of the foregoing structures;

and, novel copolymers with olefinically unsaturated monomers to provide a comb-shaped graft copolymer of macromer having pendant chains derived from the polyformal macromer used to form the graft copolymer.

Still other specific objects of this invention are to provide (a) a block copolymer of poly(siloxane-formal) surfactants and foam stabilizers by hydrosilylation; and, (b) radiation-curable polyurethanes to be used in coatings, adhesives, inks, printing plates, and binders.

DETAILED DESCRIPTION OF PREFERRED EMBODIMENTS

The cationic ring-opening polymerization disclosed herein occurs because the ethylenically-unsaturated alcohol used herein functions as a chain propagator for the ring-openable cyclic formal. This reaction was not expected to produce the macromer of this invention because it was not realized that the acryloyl, styryl and allylic groups of the alcohol would neither polymerize prematurely via carbocationic polymerization, nor interfere with the cyclic formal to be ring-opened by these catalysts. Furthermore, side reactions such as the hydride shift and transacetylation normally associated with cationic polymerization of cyclic formals, if they do occur, do not significantly impair the formation of the macromer of this invention.

Macromers of this invention have a number average mol wt Mn in the range from about 200 to about 30,000 though even higher mol wts up to about 100,000 may be formed, if desired. The acronym "(PolyM)" refers herein to the polymer chain formed by homopolymerization, block or random copolymerization, which chain consists of recurring units of one or more ring-opened cyclic formals specified by the structure (M). If a copolymer consists of definable blocks, it is referred to as a "macromer of block polyformal" whether it is formal-b-formal, or, ether-b-formal, as when polyether 'G' is present, or, formal-b-ether, as when FM is used as a propagator. The term "macromer of polyformal" is used herein to denote that at least one of the ring-opened cyclic formals (M) which, is polymerized or copolymerized and terminated at one "head" end with an ethylenically unsaturated, or vinyl group.

The cationic ring-opening polymerization of cyclic formal under the conditions of this invention is not exactly a "living" polymerization because of chain transfer and termination. Consequently, the mol wt of the macromer is independent of the amount of cationic initiator, but dependent upon the ratio of monomer to the ethylenically unsaturated alcohol serving as a propagator. Each propagator will initiate a polymer chain to form a macromer. On the other hand, the cationic polymer of cyclic formal of this invention exhibits many "living" characteristics, such as the dependence of mol wt on conversion, and the ability to form a block copolymer by sequential addition of monomers.

To facilitate this ring-opening polymerization which has "living" characteristics, so that the vinyl head group survives the reaction without forming undesired by-products, it is most preferred to use (i) a catalytic amount of a catalyst (initiator) which is a fluoride or chloride of boron, phosphorus, tin, or antimony; or, an oxonium salt of tetrafluoroboron, or hexafluorophosphate, or hexafluorontimonate; (ii) an alcohol with one of the structures (1)–(4) which is at least partially soluble, and more preferably, is completely soluble in the reaction mass, with or without a solvent; and, (iii) the system is essentially free of water, other alcohol or compound containing active hydrogen, that is, H attached to O, N or S atom.

If the cyclic formal and the alcohol are not mutually soluble, or soluble in a mutual co-solvent, the polymerization will not proceed satisfactorily. The higher the solubility, generally the better the polymerization reaction. The reaction is most preferably carried out in a bulk polymerization in a simple and convenient manner.

Typically, the cyclic formal (M) and one of alcohols (1)–(4), each of which is moisture-free, are charged to a jacketed reactor provided with a mechanical agitator and fitted with a thermoprobe and condenser. The reactor is purged with nitrogen and warmed to the polymerization temperature. The catalyst, for example, triethyloxonium hexafluorophosphate (TEOP) dissolved in methylene chloride is dripped in and the temperature of the reaction mass is controlled to provide a satisfactory rate of polymerization by raising or lowering the temperature of the circulating medium in the jacket.

The polymerization is generally carried out at a temperature in the range from about 25°–75° C. but this range is not critical, some polymerizations proceeding satisfactorily at as low as 0° C., or lower, and others at as high as 90° C., or higher. The progress of the reaction is monitored by measuring total solids. Upon completion, the polymerization is terminated with sodium bicarbonate, and an antioxidant such as Goodrite®3125 and monoethyl ether of hydroquinone (MEHQ) added. The mixture is heated to about 50° C. and maintained for about an hour. The mixture is diluted with an amount of tetrahydrofuran (THF) equivalent to the cyclic formal to reduce the viscosity. The solution of macromer is filtered through filter aid Celite 545 to remove excess sodium bicarbonate and deactivated catalyst. The unreacted monomer is removed at 60° C. under vacuum with a rotary evaporator. About 0.4 to 3.0 g of TEOP is used per 100 g of monomer depending upon the propagator used. The amount of sodium bicarbonate used as a short-stop is three times the TEOP. The antioxidant is added at about 0.2 wt % of the macromer, and an inhibitor such as MEHQ may be added at 500 ppm to stabilize the vinyl head.

The conversion to the macromer and its mol wt are controlled by the ratio of the monomer to the alcohol, according to the following equation:

$$Mn = \left[\frac{Monomer, g}{Alcohol, g} + 1\right] \times \text{mol wt of alcohol} \times \% \text{ total solids}$$

It is essential that all reactants be moisture-free because each molecule of water, if present, will initiate a polymer terminated with OH groups at both ends of the chain.

Preferred among the oxacyclic compounds are cyclic formals having structure (M) with (a) two O atoms in the ring, including 1,3-dioxolane (DOL) wherein x is 2; 1,3-dioxane (DOX) wherein x is 3; 1,3-dioxepane (DOP) wherein x is 4; and, (b) three or more O atoms in the ring, the additional O atoms being part of an ethylene oxide (—CH$_2$—CH$_2$—O—) repeating unit, for example, 1,3,5-trioxepane (TOP) and 1,3,6-trioxocane (TOC) each with 3 O atoms in the ring, 1,3,6,9-tetraoxacycloundecane or triethyleneglycolformal (TGF) and 1,3,6,11-tetraoxacyclotridecane (DDF), each with four O atoms in the ring; 1,3,6,9,12-pentaoxacyclotetradecane (POC) with five O atoms in the ring,; and, 1,3,6,9,12,15-hexaoxacycloheptadecane (HOC) with six O atoms in the ring. The most preferred cyclic formal is 1,3-dioxolane.

Among the macromers of block copolymers formed when G is present are those in which G is derived from a cationically ring-openable cyclic ether selected from the group consisting of (i) an epoxide having the structure

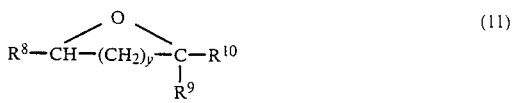
(11)

wherein, y is an integer in the range from 0 to 4, excluding 3, and, $R^8$, $R^9$ and $R^{10}$ are independently selected from the group consisting of hydrogen, $C_1$-$C_{20}$ alkyl and haloalkyl, and, $C_6$-$C_{20}$ aryl (Ar) and aralkyl, and at least one of $R^8$, $R^9$ and $R^{10}$ is hydrogen; and, (ii) an aliphatic or aromatic glycidyl ether having the structure

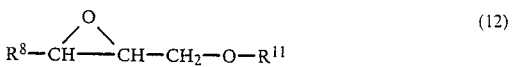
(12)

wherein $R_{11}$ represents a member selected from the group consisting of a substituted group such as a hydrocarbon group, i.e. $C_1$-$C_{20}$ alkyl, or substituted alkyl, particularly haloalkyl, alkoxyalkyl, Ar, or substituted aryl (Ar-Q), particularly where Q represents $C_1$-$C_{10}$ alkyl or haloalkyl.

Each of the foregoing ethers may also be used as a comonomer with the cyclic formal (M) to form the macromer (FM) provided that at least 25% by wt of the macromer is contributed by the formal.

G may be derived from:

(i) a 1,2-epoxide, for example ethylene oxide, propylene oxide, 1,2-epoxybutane, 2,3-epoxybutane, 1,2-epoxypentane, 2,3-epoxypentane, 1,2-epoxyhexane, 1,2-epoxydodecane, 1,2-epoxyoctadecane, and the like;

(ii) haloalkyl epoxides, and epihalohydrins, for example, 1-chloro-2,3-epoxypropane (ECH), 3-bromo-2,3-epoxypropane, and the like;

(iii) 1,3-epoxide, for example oxetane;

(iv) a 1,4-epoxide, for example tetrahydrofuran (THF);

(v) a 1,6-epoxide, for example oxepane (OXP);

(vi) aliphatic or aromatic glycidyl ethers, for example, methyl glycidyl ether, ethyl glycidyl ether, phenyl glycidyl ether, butyl glycidyl ether and the like; and, (vii) aliphatic or aromatic glycidyl esters, for example, glycidyl acetate, glycidyl chloroacetate, glycidyl butyrate, and glycidyl stearate.

Acryloyl-terminated polyformal macromers have the structure (FM) wherein R is the residue of an "acryloyl" alcohol, specifically a hydroxyalkyl ester of acrylic or methacrylic acid, the alcohol having the structure

(13)

in which the vinyl unsaturation of the head, and the terminal OH group are preserved. Among the useful hydroxyalkyl esters of acrylic and methacrylic acids having structure (13) are 2-hydroxyethyl acrylate, 2-hydroxyethyl methacrylate, hydroxypropyl acrylate, hydroxypropyl methacrylate, 4-hydroxybutyl acrylate, 4-hydroxybutyl methacrylate, hydroxymethyl acrylate, hydroxymethyl methacrylate, 12-hydroxydecyl acrylate, and the like.

When a macromer of block formal-formal copolymer is desired, it is prepared by polymerizing a first cyclic formal (Form1) with a second cyclic formal (Form2) sequentially, or, by using a macromer (FM) as a propagator to polymerize a second cyclic formal. When a first cyclic formal M1 is polymerized with a second formal M2, so that the block formal-formal macromer has the structure

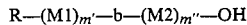

wherein, M1 and M2 each represents a formal repeating unit derived from a ring-opened cyclic formal, and, $m'$ and $m''$ are integers each in the range from 1 to about 300 such that $m'+m''=m$.

The macromer of formal-formal block copolymer may also be written as

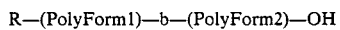

Block copolymers having the structure (FM) are prepared with an acryloyl terminated macromer of polyether having the structure (1) in which G is polyether having a number average molecular weight up to about 10,000, so that the acryloyl polyether is represented by the structure

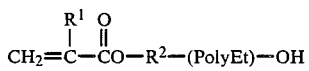

the O of the OH group being contributed by the last repeating unit of the polyether, and, wherein PolyEt represents a chain of repeating units of at least one cyclic ether having structure (11) or (12) and Mn from about 100 up to about 10,000, and containing no active hydrogen, i.e. no hydrogen attached to oxygen, nitrogen or sulfur.

For example, polypropylene glycol monoacryloylethyl ether has the structure

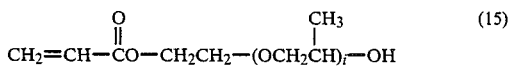

wherein i is an integer in the range from 2 to about 500.

Other acryloyl polyethers which may be used are:
polypropylene glycol monomethacryloylethyl ether
polypropylene glycol monoacryloylpropyl ether
polypropylene glycol monoacryloylbutyl ether
polytetramethylene ether glycol monoacryloylethyl ether
polytetramethylene ether glycol monomethacryloylethyl ether
polyepichlorohydrin glycol monoacryloylethyl ether,
polyepichlorohydrin glycol monomethacryloylethyl ether.
poly(tetramethylene ether/ethylene) glycol monoacryloylethyl ether, and
poly(tetramethylene ether/propylene) glycol monoacryloylethyl ether.

The acryloyl polyether macromer used as the propagator may be formed as taught in U.S. Pat. No. Re.31,468, by the action of a cationic ring-opening catalyst identified hereinabove with an alcohol with an acrylic head and the appropriate alkylene oxide, under mild reaction conditions, namely a temperature in the range from about 0° C. to about 150° C., and more preferably from about 25°–80° C., at ambient or slightly elevated pressure.

The catalyst for synthesis of my macromer is used in an amount sufficient to initiate the cyclic formal polymerization to form the macromer. It is most preferred to use a tertiary aliphatic oxonium salt such as a trialkyloxonium or other oxonium salt of the $HMF_6$ acid prepared as described in U.S. Pat. No. 3,585,227 the disclosures of which are incorporated by reference thereto as if fully set forth herein. Other cationic initiators of protic acids such as $CF_3SO_3H$ and $FSO_3H$, and Lewis acids such as $BF_3$, $BF_3$ etherates, $PF_5$, $SnCl_4$, $SnCl_2$, $SbCl_5$, $SbF_5$ may also be used.

The amount of catalyst used has very little effect on the mol wt of the macromer formed, but affects the rate, which in turn affects the temperature of the reaction. The amount used is in the range from about 0.01 part to about 5 parts per 100 parts by wt of cyclic formal monomers, and more preferably from about 0.02 to about 3 parts, being generally sufficient. It is desirable, both for economic reasons and for control of the polymerization, to keep the amount of catalyst used as low as possible.

The mol wt is controlled by the ratio of cyclic formal to acryloyl polyether. Because the polymerization proceeds via polyaddition, a designed (desired) mol wt may be obtained. Most preferred linear macromers have a Mn in the range from about 200 to about 30,000.

Styrylically terminated polyformal macromers having the structure (FM) wherein R is the residue of the "styrylic" alcohols having the structure (2) may be prepared in an analogous manner. Among these monoolefinically unsaturated "styrylic" alcohols are ortho-, meta- and para-derivates, or mixtures of derivatives of hydroxyl styrene, hydroxyl alpha-methyl styrene and 3-hydroxyl-4-methoxyl styrene (wherein spacer $R^2$ and G are absent), vinyl benzyl alcohol, hydroxyethyl styrene, hydroxypropyl styrene, and hydroxypropyl alpha-methyl styrene (wherein $R^2$ is a methylene, ethylene and propylene group, respectively and G is absent).

When a styrylically headed macromer of block ether-formal copolymer is desired, then the spacer G is polyether, and preferred styrylically terminated polyethers (2) which may be used to form macromers of styryl-headed Poly(FM) are:
polypropylene glycol monovinylbenzyl ether
polypropylene glycol monostyryl ether
polytetramethylene ether glycol monovinylbenzyl ether and,
polyepichlorohydrin glycol monovinylbenzyl ether.

The foregoing styryl-ended polyformals, homopolymers or block copolymers, are prepared in a manner analogous to that set forth hereinabove for macromers of polyformal propagated from a hydroxyalkyl ester of acrylic or methacrylic acid and block ether-formal copolymers propagated from an acryloyl-ended polyether. The styryl polyether macromer, used as the propagator, is prepared as more fully described in my aforementioned U.S. Ser. No. 796,634 the disclosure of which is incorporated by reference thereto as if fully set forth herein.

Allylically terminated polyformal macromers having the structure (FM) wherein R is the residue of the "allylic" alcohols having the aliphatic structure (3) in which the spacer $R^2$ must be present, and G is absent, may be prepared in an analogous manner with (a) relatively short chain alcohols having from 3 to about 6 carbon atoms such as allyl alcohol, 2-methyl-2-propene-1-ol (2-methallyl alcohol), 2-buten-1-ol (crotyl alcohol), 1-buten-3-ol (1-methallyl alcohol), 3-buten-1-ol, 4-penten-1-ol, 2-pentene-1-ol, 3-penten-2-ol, 4-penten-2-ol, 2-methyl-1-buten-3-ol, 2-methyl-1-buten-4-ol, 3-methyl-2-buten-1-ol, 2-ethyl-1-propen-3-ol, 2-ethyl-1-penten-3-ol, 5-hexen-1-ol, 4-hexen-1-ol, 5-hexene-1-ol, 2-methyl-1-penten-3-ol, 2-methyl-4-penten-3-ol, 4-methyl-3-penten-1-ol, and the like;

(b) relatively long chain alcohols having from 7 to about 20 carbon atoms such as 9-decen-1-ol, 10-undecen-1-ol (10-undecylenyl alcohol), and naturally occurring citronellol, oleyl alcohol or phytol;

(c) arylalcohols in which the OH group is on the side chain such as cinnamyl alcohol, and those in which the OH group is a phenolic OH group such as 2-allyl phenol; and, (d) monoadducts of a single 1,2-epoxide unit to the above mentioned "allylic" alcohols, such as 2-hydroxyethyl allyl ether, 2-hydroxy-1-methylethyl allyl ether, 2-hydroxy-2-methylethyl allyl ether, 4-hydroxybutyl allyl ether, diethylene glycol monoallyl ether, 2-hydroxy-2-chloro-methylethyl allyl ether, and the like.

When a macromer of block copolymer of ether-formal terminated with an alicyclic allyl group is desired, then the polymeric spacer G is a polyether, so that an allyl-ended polyether is represented by the structure

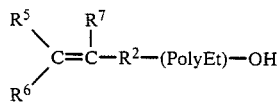

the O of the OH group being contributed by the last repeating unit of the polyether, as for example in polypropylene glycol monoallyl ether having the structure

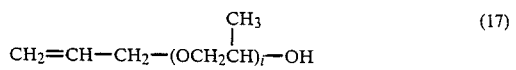

wherein $R^5$, $R^6$ and $R^7$ are each H, $R^2$ is a methylene group, and PolyEt is

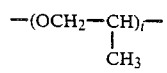

Other allyl-ended polyethers which may be used are:
polypropylene glycol monomethallyl ether
polypropylene glycol monocinnamyl ether
polypropylene glycol mono(4-allyloxybutyl) ether
polytetramethylene ether glycol monoallyl ether
polytetramethylene ether glycol monomethallyl ether
poly(tetramethylene ether/ethylene) glycol monoallylethyl ether,
poly(tetramethylene ether/propylene) glycol monomethallylethyl ether
polyepichlorohydrin glycol monoallyl ether, and,
polyepichlorohydrin glycol monomethallyl ether.

Allylically terminated polyformal macromers having the structure (FM) wherein R is the residue of the "allylic" alcohols having the alicyclic structure (4) may also be prepared. Cyclic olefinic alcohols, wherein G is absent, which may be used are those in which the olefinic bond is in the ring which may be a single or fused ring structure having from 5 to 10 carbon atoms, such as for example, 2-cyclopenten-1-ol, 2-cyclohexen-1-ol, 3-methyl-2-cyclohexen-1-ol, 3-cyclohexen-1-methanol, Nopol, dihydrocarveol, myrtenol, patchenol, 6,6-dimethyl bicyclo[3.3.1]hept-2-ene-2-ethanol[(1S)-(—)-Nopol], 5-norbornene-2-methanol, and bicyclo(2.2.2)oct-5-ene-2-methanol.

When a macromer of block copolymer of ether-formal, terminated with a cyclic allyl group is desired, then the polymeric spacer G is a polyether so that preferred allyl-ended polyethers which may be used are:
polypropylene glycol mono(5-norbornene-2-methyl) ether
polypropylene glycol mono(3-cyclohexen-1-methyl) ether
polytetramethylene ether glycol mono(5-norbornene-2-methyl) ether, and,
polyepichlorohydrin glycol mono(5-norbornene-2-methyl) ether.

The foregoing allyl-ended polyformals, homopolymers or copolymers are prepared in a manner analogous to that set forth hereinabove for macromers of polyformal propagated from a hydroxyalkyl ester of acrylic or methacrylic acid and block ether-formal copolymers propagated from an acryloyl-ended polyether. The allyl polyether macromer used as the propagator is more fully described in my aforementioned Ser. No. 771,093 the disclosure of which is incorporated by reference thereto as if fully set forth herein.

It will now be evident from the foregoing, that the use of vinyl-functional alcohols as propagators result in macromers of formal homopolymers (5), of random copolymers of formal-formal (7a), formal-ether (7b), and formal-trioxane (7c); of block copolymers of formal-formal (8a), and formal-ether (8b), by sequential additions of a formal monomer and a comonomer; when G=(PolyEt) is present, of an ether-formal (9); and, of block copolymers of formal-ether (10) using a macromer of polyformal as a propagator to polymerize a cyclic ether.

The macromer is characterized by gel permeation chromatography (GPC) analysis at 40° C. using a Water's GPC Model 200 with columns packed with Styragel. THF is used as carrier solvent. All mol wts are calibrated relative to polystyrene. Relatively low molecular weight (mol wt) macromers, particularly those having from 2 to about 300 repeating units, are formed with substantially uniform mol wt distribution such that the ratio of the weight average mol wt (Mw) to the number average mol wt (Mn) is not substantially above about 5.

FT infrared spectra were recorded with a Nicolet 7199 spectrometer. Samples were prepared by applying a thin coat of macromer on a KBr crystal.

Carbon-13 NMR spectra were obtained at 20.1 MHz using a Bruker WP-80 spectrometer. Macromers were examined as a 20 wt % solution in benzene-d6 or chloroform-d with internal tetramethylsilane reference at 30° C.

Proton NMR spectra were obtained at 200.13 MHz in chloroform-d at 30° C. using a Bruker WH-200 spectrometer. Trichloroacetylisocyanate was used as a derivatizing 35 agent for the OH group analysis.

Mass spectra were obtained with a Varian MAT 311A mass spectrometer in the field desorption mode. Samples were dissolved in either methanol or THF. The solution was then saturated with solid LiBr so that the lithiated molecular ions [MLi]+ were produced during analysis.

Glass transition temperature ($T_g$) and melting point is determined by a Perkin-Elmer DSC-2 differential scanning calorimeter at a 40° C./min heating rate under helium.

Hydroxyl number (OH No.) was determined by acetylation with an acetyl anhydride-pyridine mixture according to ASTM D-4274 procedure and the end point is determined by automatic titration. The OH No. is defined as the milligram equivalent of KOH per gram of the macromer, where a mole of KOH is equivalent to-one mole of OH group.

Iodine number is determined by addition of iodine monochloride to the olefinic double bond according to Wijs method (ASTM D-460). Excess ICl added is determined by titration with thiosulfate. Iodine No. is defined as the grams of iodine absorbed per 100 g of polymer. Only the macromers terminated with an allyl group can be determined, whereas those terminated with an acrylic group interfere with the analysis. Consequently, the vinyl equiv. wt. of acrylic terminated macromers is determined based on the morpholine method according to a procedure described by F. E. Critchfield et al (*Anal. Chem.*, 28, 76 (1956)).

The chlorine content was determined by the Shoniger method, and this Cl content is used to calculate the number of ECH units in the copolymers.

In the following illustrative examples, a vinyl-headed macromer of polyformal is prepared in a glass reactor equipped with a mechanical agitator, a thermometer, and a condenser under a nitrogen atmosphere, by bulk polymerization. The reactor is conditioned by purging with nitrogen while heating with a heat gun. While maintaining a nitrogen blanket, sieve-dried DOL and the vinyl-headed propagator is charged into the reactor and the solution brought to 45°-5° C. Then TEOP dissolved in a small amount of sieve-dried methylene chloride was then added incrementally. As soon as the polymerization was initiated, the reactor is cooled to hold the temperature at 50° C. The polymerization was followed by measuring the total solids. Upon completion, the polymerization was terminated with sodium bicarbonate in an amount about three times the amount of TEOP, and antioxidant (Goodrite® 3125), about 0.2 wt % of the macromer added. A small amount of MEHQ, sufficient to stabilize the acrylic head, about 500 ppm, is also added. The mixture is heated at 50° C. for 1 hr, then diluted with THF in an amount equivalent to the DOL to reduce the viscosity. The solution is filtered through Celite 545 filter aid to remove excess sodium bicarbonate and the deactivated catalyst. Unreacted monomer was removed under vacuum at 60° C. with a rotary evaporator. About 0.4-2.0 g of TEOP is used per 100 g of monomer, the amount of TEOP being chosen for the propagator used.

Preparation of acryloyl terminated formal macromer

In the following four illustrative examples, in a manner analogous to that described hereinabove, an acryloylethyl-terminated formal macromer is prepared by polymerization of DOL with 2-hydroxyethyl acrylate(HEA). The reactor was conditioned by purging with nitrogen while heating with a heat gun. Under nitrogen, sieve-dried DOL and HEA were charged to the reactor and the solution brought to 45°-50° C. The progress of polymerization was followed by measuring total solids. Upon completion, the polymerization was terminated with sodium bicarbonate and Goodrite 3125 and MEHQ were added. The mixture was heated to 50° C. for 1 hr, then diluted with an amount of THF equivalent to the amount of DOL to reduce the viscosity. The solution of macromer was filtered through filter-aid Celite 545 to remove excess sodium bicarbonate and the deactivated catalyst. The unreacted monomer was removed at 60° C. under vacuum with a rotary evaporator. The polymerization conditions are set forth in Table I herebelow.

The mol wt of the macromer is a function of the molar ratio of DOL/HEA; the higher the ratio and conversion, the higher the mol wt. The formal macromers obtained are characterized as liquids or low-melting solids having a glass transition temperature Tg, lower than $-50°$ C. The mol wts (calculated from OH numbers) are given in the Table I herebelow. FT infrared spectra show characteristic absorptions at 3400-3500 cm$^{-1}$ for the terminal OH group, and at 1602 and 1640 cm$^{-1}$ as a doublet for the conjugated C=C 1 stretchings and 1724 cm$^{-1}$ for the carbonyl stretching of the terminal acrylic group. The characteristic absorption of the DOL polymer backbone show at 2989, 2881, and 2821 cm$^{-1}$ for the C—H stretchings and at 1119 and 1038 cm$^{-1}$ for the strong C—O single bond stretchings. The proton NMR spectra of macromers show characteristic chemical shifts at 6.4(d), 6.2(m), 5.9(d) ppm for the acrylic group; at 4.3(m), 3.8(t) ppm for the ethylene oxide unit of the terminal acryloylethyl group; and at 2.9 ppm as a singlet for the proton of the terminal OH group. The proton NMR spectra of macromers also show characteristic chemical shifts of the DOL polymer backbone at 4.8(s) ppm for the protons of oxymethylene units and 3.7(s) ppm for the protons of the oxyethylene units. The carbon-13 NMR spectra of macromers show characteristic chemical shifts of the terminal acryloylethyl group at 129 and 132 ppm for the olefinic carbons, at 166 ppm for the carbonyl carbons, and at 68 and 64 ppm for the carbons of the ethylene oxide unit. The C-13 NMR spectra of macromers also show characteristic chemical shifts of the DOL polymer backbone at 96 ppm for the carbons of oxymethylene units and 67 ppm for the carbons of oxyethylene units and at 62 and 71 ppm for the —CH$_2$CH$_2$OH and —CH$_2$CH$_2$OH carbons, respectively, of the repeat unit adjacent to the terminal OH group.

FD mass spectra of the macromers listed in Table I herebelow are unsatisfactory and they desorbed poorly. No useful spectra are obtained. The close match of mol wts calculated from OH number, VEW determined by the morpholine method, and stoichiometry as shown in Table I, together with the FT-infrared and proton and C-13 NMR spectra, is evidence that the macromer contains one OH group, and one acryloylethyl group per polymer chain, thus:

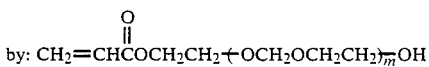

where m=6.3 to 74.

Determined of mol wt by GPC, calibrated relative to polystyrene, does not correlate well with the actual mol wt. But GPC results show only a trace of cyclic oligomers. The macromers listed in Table I have a mol wt distribution Mw/Mn in the range from 0.9 to 3.2, the higher the mol wt the broader the mol wt distribution. No high mol wt tail is observed in the GPC curves, evidence that macromers crosslinked via the acrylic head, are absent.

TABLE I

ACRYLOYLETHYL-ENDED MACROMERS OF POLY(DOL)

| Example No. | 1 | 2 | 3 | 4 |
|---|---|---|---|---|
| Monomer | DOL | DOL | DOL | DOL |
| wt., g | 100. | 500. | 1000. | 400 |
| moles | 1.35 | 6.75 | 13.5 | 5.4 |
| Propagator | HEA | HEA | HEA | HEA |
| wt., g | 23.20 | 114. | 55. | 7. |
| moles | 0.2 | 0.98 | 0.47 | 0.06 |
| DOL/HEA (molar) | 6.7 | 6.9 | 28. | 89. |
| TEOP, g | 1.5 | 9.0 | 15. | 6. |
| wt. % | 1.22 | 1.47 | 1.35 | 1.47 |
| Pzn. Temp., °C. | 50. | 45. | 50. | 50. |
| Pzn. Time, hr. | 24. | 22. | 6. | 6. |
| Conversion, % | 80. | 79. | 84. | 84. |
| GPC Mn | 841. | n.d. | 1500. | 4090. |
| Mw/Mn | 1.9 | n.d. | 2.5 | 3.2 |
| Tg by DSC, °C. | −81 | n.d. | −63 | −58 |
| OH No.* | 96 | 70 | 29 | 10 |
| Mn | | | | |
| from GPC | 841 | n.d. | 1500 | 4090 |
| from OH number* | 584 | 800 | 1934 | 5610 |
| from St'ch'metry | 493 | 494 | 1869 | 5665 |
| from VEW** | 650 | 687 | n.d. | n.d. |
| from H NMR | 580 | 705 | n.d. | n.d. |

*by titration; n.d. = not determined
**VEW = vinyl equivalent weight

Preparation of allylically terminated homopolyformal macromers

A. In the following illustrative example, an allyl-headed macromer of polyformal is prepared in a manner analogous to that described hereinabove, with 100 g DOL (11.35 moles), in the presence of 11.2 g allyl alcohol (AA) (0.19 mold, using 0.5 g TEOP (0.45 wt %). The polymerization was carried out at 50° C. for 24 hr and yielded 73% conversion.

The allylically-terminated macromer of polyformal obtained is a liquid with a Brookfield viscosity (determined with a Brokfield viscometer) of 180 cps at 25° C. and a glass transition temperature Tg of −81° C. FT infrared spectra of macromers show characteristic absorptions at 3400–3500 cm$^{-1}$ for the terminal OH group; at 3080 and 1650 cm$^{-1}$ for the C=C stretchings of the terminal allyl group. The characteristic absorption of the DOL polymer backbone show at 2989, 2881, and 2821 cm$^{-1}$ for the C—H stretchings, and at 1119 and 1038 cm$^{-1}$ for the C—O single bond stretchings.

The proton NMR spectra of the macromers show characteristic chemical shifts at 5.91(m), 5.2(d), and 5.19(d) ppm for the vinyl hydrogens, and 4.09(d) ppm for the methylene hydrogens of the terminal allyl group; and at 2.9 ppm as a singlet for the proton of the OH group. The proton NMR spectra of macromers also show characteristic chemical shifts of the DOL polymer backbone at 4.8(s) ppm for the protons of oxymethylere units, and 3.7(s) for the protons of the oxyethylene units.

The carbon-13 NMR spectra of macromers show characteristic chemical shifts at 136, and 117 ppm for the vinyl carbons and at 68 ppm for the carbons of the methylene group of the terminal allyl group. The C-13 NMR spectra also show shifts of the DOL polymer backbone at 96 ppm for the carbons of the oxymethylene units and 67 ppm for the carbons of the oxyethylene units, and at 62 and 71 ppm for the —CH$_2$CH$_2$OH and —CH$_2$CH$_2$OH carbons, respectively of the repeat unit adjacent to the terminal OH group.

FD mass spectra show (i) a predominant species with mol wts of 58+74m corresponding to a formula of [AA+(DOL)$_m$] for the formal macromer; and (ii) minor series of unknown species with mol wts of 62+74m and 54+74m which may be ion fragments of macromer species. Essentially no cyclic polymers are detected. No species of macromer terminated at both ends with an allylic group is detected in FD mass spectra. Species terminated at both ends with an unsaturated group are highly undesirable as they would provide crosslinking when the macromer is polymerized.

The structure of macromers of polyformal terminated at one end with an allyl group and at the other with a OH group was further corroborated by end group analysis. The macromer has a OH No. of 162 and an Iodine No. of 43. The corresponding mol wt calculated from OH number is 346, and from the iodine number is 591. Calculated from the proton NMR spectra by integration, the mol wt is 510 based on the OH group, and is 692 based on the vinyl group, evidence of only one allyl group and one OH group per chain as in the structure:

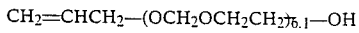

$$CH_2=CHCH_2-(OCH_2OCH_2CH_2)_{\overline{76.1}}-OH$$

Determination of mol wt by GPC calibrated with respect to polystyrene gave a much higher value (810) than the actual mol wt, but showed no cyclic oligomers. The mol wt distribution of the macromers is 1.9.

In a manner analogous to that described hereinabove, formal macromers having mol wts in the range from 750 to 2500 (calculated from OH numbers) are prepared with 2-methyl-2-propene-1-ol, undecenyl alcohol, cinnamyl alcohol, and allyl phenol respectively.

It is to be noted that only primary and secondary alcohols provide the desired formal macromers with a terminal allylically unsaturated group, and tertiary alcohols do not. For example, polymerization with 3-butene-2-ol produces no allylic termination in the polyformal obtained.

B. In a manner analogous to that described hereinabove, a terminal, ethylenically unsaturated cycloaliphatic ring is provided by polymerization of 100 g (1.35 mole) DOL, and 17.0 g (0.14 mole) 5-norbornene-2-methanol (NOR) catalyzed with 0.4 g (0.24 wt %) TEOP at 50° C. After 8 hr at 81% conversion, polymerization was terminated as described hereinbefore.

The formal macromer obtained is characterized as a low melting solid having a mol wt of 1305 (calculated from a OH number of 43). FT infrared spectra are not informative as the olefinic absorptions of the terminal head group are overlapped by absorptions of polyformal. The carbon-13 NMR spectra of the macromer shows characteristic chemical shifts of a polyformal backbone and at 138.3, 137.8, and 133.1 ppm for the olefinic carbons of the norbornene group. FD mass spectra show a predominant species with mol wt of 124+114m corresponding to a formula of [NOR+(DOL)$_m$] for the formal macromer having a structure:

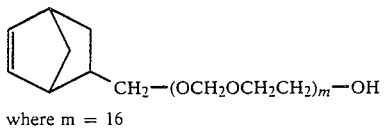

where m = 16

Preparation of styrylically terminated homopolyformal macromer

In the following illustrative example, in a manner analogous to that described hereinabove, a styryl-terminated formal macromer is prepared with a terminal, vinylbenzyl head group by polymerization of 60 g (0.81 mole) DOL, and 8.0 g (0.06 mole) vinylbenzyl alcohol (VBA) catalyzed with 0.6 g (0.87 wt %) TEOP. The polymerization is carried out at 45° C. for 6 hr with 73% conversion, in the presence of MEHQ inhibitor, and terminated as before. The macromer is then worked up and recovered. Typically, a mixture of meta- (60%) and para- (40%) substituted macromers are recovered.

The macromer has a mol wt of 863 (calculated from a OH number of 65). FT infrared spectra show characteristic absorptions of polyformal and a terminal OH group as described hereinabove. In addition, absorptions corresponding to the stretchings of the aromatic ring are observed at 1600–1700 cm$^{-1}$. The terminal vinyl benzyl group is also detected by C-13 NMR with chemical shifts:

(21)

$CH_2=CH-$ 114  137 — (phenyl) — $CH_2O-$ 73 ppm

Further evidence of the foregoing structure is provided by FD mass spectra which show a series of predominant species with mol wt of 134+114n corresponding to the formula [VBA+(DOL)$_n$], for a macromer having the structure:

(22)

$CH_2=CH-$(phenyl)$-CH_2$-$(OCH_2OCH_2CH_2)_m$-OH where m=9.8.

No species terminated with a vinyl benzyl group at each end is obtained.

Preparation of acryloyl terminated macromers of formal-ether random copolymers In the following illustrative examples 5 & 6, acryloyl-headed macromers of DOL random copolymers are made in a manner analogous to that described hereinabove. Sieve-dried DOL and comonomer propylene oxide (PO), or DOL and comonomer epichlorohydrin (ECH) are copolymerized in the presence of 2-hydroxyethyl acrylate (HEA), with TEOP dissolved in a small amount of sieve dried methylene chloride, added incrementally. The conditions of polymerization are given in Table II, that of DOL and PO being carried out at relatively lower temperature because of the lower boiling point of PO relative to ECH.

The macromers are liquids or low melting pastes with Tg less than −50° C. FT infrared spectra are similar to those obtained for the acrylic-headed DOL macromer of homopolymer. Additional absorptions are observed for the DOL/ECH comonomer at 747 and 710 cm$^{-1}$ attributed to the C—Cl stretchings of ECH units. The carbon-13 NMR spectra of copolymer of DOL/PO show additional chemical shifts at 75.4 and 17.5 ppm attributed to the methylene and methyl carbons, respectively, of PO units. For copolymer of DOL/ECH, additional chemical shifts were observed at 76.4 and 45.2 ppm attributed to the methylene and chloromethyl carbons, respectively of ECH units.

Mol wt determination by GPC calibrated with respect to polystyrene, is not as accurate as determinations by titration for OH number, and stoichiometry (knowing that each molecule of propagator generates only one chain, and measuring the conversion). No indication of a significant amount of macromers crosslinked prematurely via the acrylic head.

The macromer of random copolymer of DOL/PO has the structure:

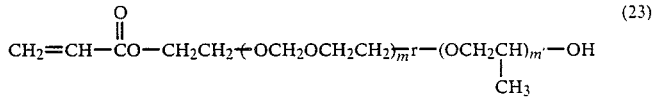

where m=38.4 and m′=9.

The macromer of random copolymer of DOL/ECH has the structure:

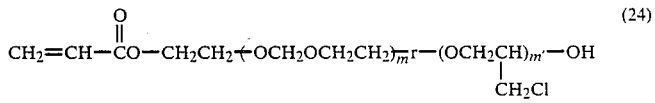

where m=16.5 and m′=0.3.

TABLE II

MACROMERS OF DOL COPOLYMERS TERMINATED AT ONE END WITH AN ACRYLOYLETHYL GROUP

| Example No. | 5 | 6 |
|---|---|---|
| Monomer | DOL | DOL |
| wt., g | 350. | 600. |
| moles | 4.72 | 4.47 |
| Comonomer | PO | ECH |
| wt., g | 65. | 400. |
| moles | 1.12 | 3.5 |
| DOL/comonomer(molar) | 4.2 | 1.28 |
| Propagator | HEA | HEA |
| wt., g | 9.4 | 49. |
| moles | 0.08 | 0.42 |
| Monomer/Propagator (molar) | 72. | 18.9 |
| TEOP, g | 6.5 | 5.0 |
| wt. % | 1.53 | 0.48 |
| Pzn. Temp., °C. | 25. | 35. |
| Pzn. Time, hr. | 22. | 4. |
| Conversion, % | 80. | 93. |
| GPC excluding cyclic oligomers | | |

TABLE II-continued
MACROMERS OF DOL COPOLYMERS TERMINATED AT ONE END WITH AN ACRYLOYLETHYL GROUP

| Example No. | 5 | 6 |
|---|---|---|
| Mn | 2430. | 2527. |
| Mw/Mn | 2.7 | 2.5 |
| % cyclic oligomers | negl. | negl. |
| Br'kf'd Visc., cps @ 25° C. | 4600 | 16,100. |
| DSC, Tg, - °C. | 65 | 49 |
| Hydroxyl Number by titration | 16 | 26 |
| Mn | | |
| from GPC | 2430 | 2527 |
| from OH number(titration) | 3506 | 2200 |
| from Stoichiometry | 4190 | 2310 |
| DOL/comonomer (molar) by H NMR | 4.0 | 1.8 |

Preparation of allylically terminated macromer of formalether random copolymer

In the following illustrative example, in a manner analogous to that described hereinabove, an allylically-terminated macromer of a random copolymer of etherformal is prepared by copolymerization of 50 g (0.67 mole) DOL and 50 g (0.54 mole) ECH in the presence of 5.0 g (0.09 mole) AA with 0.75 g TEOP (0.67 wt %), dissolved in a little sieve dried methylene chloride and added incrementally. The polymerization is carried out at 50° C. for 5 hr with 90% conversion.

The macromer having a Brookfield viscosity of 6100 cps at 25° C. and a Tg of −58° C. contains 46 wt % ECH. The structure of the macromer copolymer is:

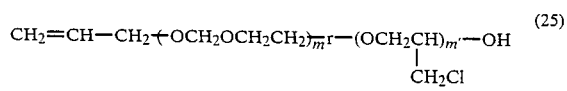
(25)

where m=8.2 and m'=4.7, which structure is confirmed by FT infrared, proton and C-13 NMR spectra. The mol wt calculated from a OH No. of 56 is 1002; and, is 1104 determined from an iodine No. of 56; determined by GPC and calibrated relative to polystyrene shows a Mn of 1200 with a mol wt distribution Mw/Mn of 1.9.

Preparation of acryloyl terminated macromer of ether-formal block copolymer

In the following illustrative examples, in a manner analogous to that described hereinabove, an acryloyl-terminated macromer of block copolymer of ether-formal is prepared by polymerization of 200 g of DOL, 100 g of polyepichlorohydrin glycol monoacryloylethyl ether (Mn=890 as calculated from a OH No. of 63) which are polymerized according to U.S. Pat. No. Re. 31,468, catalyzed with 2.5 g (0.7 wt %) TEOP for 6 hr at 50° C., when 85% conversion is obtained. The macromer obtained has a mol wt of 2550 (calculated from a OH No. of 22). The weight ratio of formal/ether block in the macromer is about 2.1. The structure of the macromers are confirmed by FT-infrared, proton and C-13 NMR spectra.

The macromer of block copolymer of epichlorohydrinformal has a structure:

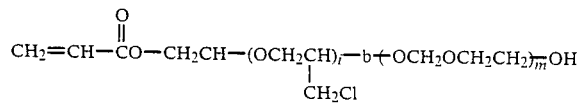
(26)

wherein i=8.4, and m=22.4, though i may range from 2 to about 50.

After the macromer of this invention is made, it may be used in the subsequent copolymerization of another monomer. When the macromer of this invention is (a) used as a monomer to form a homopolymer it is referred to as a homopolymer of macromer, (b) used as a comonomer, the resulting new polymer is referred to as a "polymer of macromer".

When a formal macromer (FM) is first prepared, and used as a propagator for the polymerization of a polyether such as epichlorohydrin, the block copolymer (10) is formed. It is preferred to use a macromer of homopolyformal as the propagator, but any of the foregoing embodiments of the formal macromer (FM) will provide a satisfactory propagating species.

When copolymerized with an ethylenically unsaturated monomer, as in (b), the resulting polymer is combshaped with pendant chains of the macromer and is referred to as a "graft copolymer of macromer". When coupled with a functional polymer, either by a diisocyanate coupling agent or hydrosilylation, the resulting new polymer is referred to as a "block copolymer of macromer".

The terminal OH group of the formal macromers (FM) are in some cases required to be end-capped with an end-capping group so that there is no OH group to interfere with the subsequent utilization (in a reaction or copolymerization) of the double bond of the macromer. The end-capping group is not narrowly critical and a variety of esterification and etherification reactions may be used to cap the terminal OH groups, as for example disclosed in U.S. Pat. Nos. 2,998,409 and 3,507,927; British Pat. Nos. 748,856; 848,660; 869,323; 877,256; 911,959; inter alia; or, by reacting with an alkylisocyanate as in British Pat. No. 924,259; or, by reacting with diazomethane as in British Pat. No. 894,439; or, by reacting with acrylonitrile or trialkylchlorosilane.

The preferred end-capped polyformal macromer is represented by the structure $$R-(M)_m-OZ \qquad \text{(FMec)}$$

Wherein Z is the residue of an end-capping unit selected from the group consisting of $-R^5$,

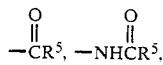, $-CH_2CH_2CN$, $-SO_3Na$, $-SO_3K$, $-SO_3NH_4$, and the like, wherein R and $R^5$ have the same connotation as hereinabove, but $R^5$ cannot be H.

The macromers of polyformals, end-capped or not end-capped, depending upon which of the foregoing ethylenically unsaturated head groups is present, and the structure and length of its chain, may be tailored to provide a wide variety of properties in copolymers of macromer formed with them in subsequent polymerizations. Such polymerizations include:

1. Grafting the macromer on a polymer by a free radical reaction initiated by an appropriate initiator or by radiation.

2. Forming a comb copolymer by copolymerizing the macromer with a copolymerizable monomer containing an ethylenically unsaturated functional group by:
   a. free radical polymerization
   b. metathesis polymerization
   c. group transfer polymerization.

3. Forming a formal-siloxane block copolymer by a hydrosilylation reaction.

Grafting of macromer may be effected by polymerizing a macromer with or without a comonomer of ethylenically unsaturated monomer, onto an existing polymer backbone initiated by a free-radical or radiation. This type of conventional graft-polymerization is a well-known art (see for example "Graft Copolymers" by Battaerd, H. A. J. and Tregear, G. W., Interscience Publishers, New York 1967). The graft copolymerization may be effected by any of the conventional techniques of emulsion, bulk, suspension and solution polymerization. Polymerization may be initiated by heat, peroxide, or hydroperoxide decomposition, redox catalysts, or any other free-radical generation, such as by radiation. The chemical nature of the existing polymer is not critical so long as it contains no groups which inhibit polymerization. However, polymers lacking in reactive groups generally give low yields of grafted material. For many industrial applications, the presence of only 2-5% of graft copolymer is sufficient to improve the physical properties of the unmodified material. One specific example is the mixing of liquid unsaturated polyester (described in U.S. Pat. No. 4,101,604 the disclosure of which is incorporated by reference thereto as if fully set forth herein) with styrene and a macromer of this invention, and thermoforming the mixture in the presence of a free radical catalyst, so that the macromer is grafted.

Comb copolymers of macromers may be derived from a macromer, end-capped or not end-capped, with one or more conventional ethylenically unsaturated monomers. The length to which the backbone is grown may be controlled by conventional means to provide the desired mol wt of the comb copolymer. It will be recognized that the length of each pendant polyformal chain is fixed by the mol wt of the macromer in advance. The relative molar amount of the polyformal macromer to a copolymerizable monomer will preferably range from about 3(macromer):1 (monomer) to about 1(macromer):1000(monomer).

When a comb-shaped graft copolymer of formal macromer is desired, it is prepared by polymerizing a polyformal macromer (FM) with an olefinically unsaturated monomer so as to have the structures

$$[R-(M)_m-OZ]_{n'}[M_o]_{n''} \quad (27)$$

wherein $M_o$ represents the olefinically unsaturated monomer;

$n'$ represents an integer in the range from 1 to about $10^4$, preferably $1-10^3$ and refers to the number of pendant polyformal chains;

$n''$ represents an integer in the range from 1 to about $10^6$, more preferably $5-10^5$; and, R, M, and m, have the same connotation as before.

Monomers suitable for forming comb copolymers include:

(i) $C_2-C_{12}$ vinyl monomers such as readily available vinyl chloride, vinyl acetate, acrylonitrile, ethylene, propylene, 4-vinyl pyridine, vinyl pyrrolidone, vinyl benzoic acid, ethyl vinyl ether, salts of vinyl sulfonate, vinylidene chloride, N-vinyl carbazole, and the like;

(ii) $C_8-C_{16}$ styryl monomers such as styrene, 4-chlorostyrene, vinyl toluene, alpha-methyl styrene, and the like;

(iii) alpha,beta-ethylenically unsaturated carboxylic acids such as acrylic acid and methacrylic acid having from 3 to 8 carbon atoms, and derivatives thereof selected from the group consisting of esters of $C_1-C_{20}$ alcohols such as ethyl acrylate, ethyl methacrylate, glycidyl acrylate, butyl acrylate, 2-ethylhexyl acrylate; acrylamide and amides of $C_1-C_{20}$ amines such as N,N-dimethylacrylamide; and, metal salts such as sodium acrylate; and, the corresponding analogs of methacrylates and methacrylamide;

(iv) $C_4-C_8$ diene monomers such as butadiene and isoprene;

(v) $C_5-C_{10}$ allylically unsaturated monomers such as allyl acetate, and diallylphthalate; and, (vi) $C_5-C_{14}$ cyclic olefins such as norbornene, dicyclopentadiene, cyclopentene, 1,5-cyclooctadiene and norbornadiene.

When the polyformal macromer contains an acryloyl head (1) or styryl head (2), one or more of the copolymerizable monomers is preferably selected from (i)-(v), and more preferably from (i)-(iv). When the monomer is from (v) a polyformal macromer with an allylic head (3) is most preferred. Free-radical chain polymerization, commonly used in the art, as described in "Encyclopedia of Polymer Science and Technology" Vol 7, Interscience Publishers, New York (1967), is preferred for all the above-mentioned polymerizations. It is typically carried out with a free-radical initiator and can be carried out in bulk, mass, solution, slurry emulsion, or dispersion polymerization.

When a monomer is used from (vi), the polyformal macromer preferably has a head derived from a cyclic olefin (13) and end-capped. Metathesis polymerization, described for example in U.S. Pat. No. 3,853,830, is preferred.

When the comb copolymers of macromers are to be made by group transfer polymerization as described in U.S. Pat. Nos. 4,417,034 and 4,508,800, the preferred polyformal macromer contains a methacryloyl head (1), as is also the case when only a monomer from (iii) is used.

Comb-shaped grafted copolymers derived with my macromers may be used to produce new polymeric materials designed for (A) their bulk properties as a function of properties of the combination of backbone and pendant chain polymers, and, (B) their pendant chains performing a specific function.

In the group (A), a macromer with elastomeric properties and low Tg, such as a copolymer of DOL and propylene oxide, may be incorporated into a thermoplastic such as polystyrene, poly(vinyl chloride) (PVC), poly(methyl methacrylate), or poly(acrylonitrile), by copolymerization with corresponding ethylenically unsaturated monomer, to improve the toughness of the thermoplastic, or form a new thermoplastic elastomer.

In the group (B), low Tg pendant chains of macromer of a graft copolymer serve as non-extractable plasticizer. For hydrophilic macromers, pendant chains of macromer of a graft copolymer improve antistatic properties, wettability, dyeability, adhesion, or spreadability for coating applications, and to provide non-fouling properties which minimize protein or cell adsorption to polymeric surfaces in medical applications. They can also be used as polymeric surfactants. Pendant chains of macromer also improve dispersability and compatibility of the graft copolymer for blends. For example, grafted copolymers of a macromer of DOL and propylene oxide copolymer and n-butyl acrylate or butadiene are good impact modifiers for polyacetal, PVC, and polycarbonate. Another example is of a graft copolymer of a macromer with styrene can be used as a compatibilizer for the blend of incompatible PVC and polystyrene.

Macromers of this invention are also useful as dispersants for the non-aqueous dispersion polymerizations of vinyl, acrylic or styrenic monomer to make high solid dispersions with low viscosity which improve productivity and minimize reactor fouling. High-solids dispersions are highly desirable in the fields of coatings, adhesives, paints, etc. The OH groups of pendant chains of graft copolymers of macromers can be used as reactive sites to crosslink or couple with other functional polymers with a suitable coupling agent, such as diisocyanate.

A non-hydrolyzable formal-siloxane block copolymer of the macromer is prepared from end-capped macromers possessing an allyl head group (3) and (4) by hydrosilylation.

An organohydrosiloxane polymer may be a mono-, di-, or polyhydrosiloxane such as those disclosed in greater detail in U.S. Pat. No. 4,150,048 to Schilling et al, the disclosure of which is incorporated by reference thereto as if fully set forth herein. Preferred organohydrosiloxane polymers are polymethyhydrosiloxanes and copolymers of methyhydrosiloxane and dimethysiloxane represented by the formula $$Me_3SiO(Me_3SiO)_k(MeSiHO)_{k'}SiMe_3 \quad (19)$$

wherein Me=methyl, k is an integer in the range from 0 to about 300, and k' is an integer in the range from 1 to about 30.

Particularly preferred organohydrosiloxanes have a Si-bonded H at each end as shown by the formula $$HR''_2SiO[R''_2SiO]_zSiR''_2H \quad (20)$$

in which R" is an unsubstituted or halogen-substituted monovalent $C_1$-$C_5$ hydrocarbon group and z is an integer in the range from 0 to about 300, more preferably 5 to 50.

The block copolymer is formed under addition reaction conditions, preferably at elevated temperature from about 50°–100° C. in the presence of a non-reactive solvent, and catalyzed by a neutral Pt-containing hydrosilation catalyst such as chloroplatinic acid described in U.S. Pat. No. 3,220,972, or Pt metal deposited on charcoal, used in concentrations disclosed in U.S. Pat. No. 3,507,815, namely from 0.001% to about 5% by wt of the reactants.

The formal-siloxane block copolymer of macromer formed with a polyhydrosiloxane may be represented by the formula $$A'A''_{k'} \quad (28)$$

wherein, A' represents the residue of a polysiloxane block (20); A" represents the residue of a polyformal block of end-capped macromer; and, k' is an integer in the range from 1 to about 30, representing the number of Si—H in the original polysiloxane.

The macromer of this invention may be chain extended with other polyols to form radiation-curable polyurethanes with a diisocyanate as described in U.S. Pat. Nos. 4,377,679; 3,960,572; and, 3,850,770.

Preparation of allylically terminated macromer of formalether block copolymer

In the following illustrative example, in a manner analogous to that described hereinabove, an allylically-terminated macromer of block copolymer of formalether is prepared by polymerization of 250 g (2.7 mole) ECH, and 100 g (0.13 mole) of allyl-terminated macromer of DOL made in Example 1 having a mol wt of 758 calculated from a hydroxyl number of 74, catalyzed with 1.0 g (0.28 wt %) TEOP. After 6 hr at 90% conversion, polymerization was terminated as before.

The macromer of block copolymer of formal-ether obtained has a mol wt of 2158 (calculated from a OH number of 26). The weight ratio of ether/formal blocks in the macromer is about 2.0.

The macromer of block copolymer of formal-ether has a structure:

$$CH_2=CH-CH_2(-OCH_2OCH_2CH_2)_{\overline{m}}b\text{-}(OCH_2CH)_{m'}-OH \quad (29)$$
$$\qquad\qquad\qquad\qquad\qquad\qquad\qquad\qquad\qquad |$$
$$\qquad\qquad\qquad\qquad\qquad\qquad\qquad\qquad\quad CH_2Cl$$

Preparation of graft copolymer of macromer of DOL/ECH random copolymer and alkyl acrylate An acrylate elastomer containing ethyl acrylate, n-butyl acrylate, and macromer of DOL and epichlorohydrin random copolymer from the immediately preceding example 6, with methacrylic acid and vinylbenzyl chloride as cure site monomers were prepared using standard emulsion polymerization techniques such as described in U.S. Pat. No. 3,976,610 and 3,525,721. The recipe used, in which all quantities are weights given in gms., is as follows:
ethyl acrylate: 200.
n-butyl acrylate: 175.
macromer of DOL and ECH copolymer: 125.
methacrylic acid: 2.
vinylbenzyl chloride: 8.
distilled water: 750.
Gafac PE 510 [alkylphenoxy poly(oxyethylene) ethyl phosphate]: 10.
Daxad 17 (polymerized alkyl naphthalene sulfonic acid) sodium sulfate: 1.5
Sequestrene NaFe (sodium ferric ethylenediamine tetraacetic acid): 0.05
Hampene 100 (as 35% by wt soln. in water) 0.12 SFS (sodium formaldehyde solfoxalate): 0.2
$Na_2S_2O_4$: 0.42
PHMP (55% active, paramethane hydroperoxide): 0.42

The Gafac PE 510 and Sequestrene NaFe was mixed in 375 g of water and adjusted to a pH of 6.5. The ethyl acrylate, n-butyl acrylate, macromer of DOL and ECH, methacrylic acid, and vinylbenzyl chloride were mixed. The Gafac solution was added into the mixed monomers and purged with nitrogen gas to form an emulsion and eliminate oxygen. To a reactor equipped with a condenser and a mechanical stirrer, was added the Daxad 17, sodium sulfate, 375 g of water and 132 g of premixed monomer emulsion, and then purged with nitrogen. The reaction mixture was warmed to 25° C. and the hydroperoxide, SFS, and Na$_2$S$_2$O$_4$ were added to initiate the polymerization. The remaining premixed monomer emulsion was proportioned into the reactor with a metering pump over a 2.5 hr period. Total polymerization time was 4 hr. Polymerization temperature was maintained at about 25°–30° C. The emulsion was coagulated using a 2% by wt solution of Epsom salt in water. The isolated elastomer was washed with water and dried under vacuum at 60° C. overnight. A total of 488 g of polymer was obtained (98% yield) with a 24 raw polymer Mooney value (ML-4 @100° C., ASTM D1646). The elastomer is not sticky which implies no significant amount of unreacted macromer. Cured elastomer shows good low temperature properties and oil resistance.

The comb copolymer of DOL/ECH macromer has the structure (excluding cure-site monomers),

 (31)

wherein, Et and Bu represent ethyl and butyl respectively, DOL represents the repeating unit —OCH$_2$OCH$_2$CH$_2$—; ECH represents the repeating unit

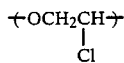

wherein a+b=n''; a=0.589; b=0.402; and n''=0.08 (molar ratio), so that the weight ratio of ethyl acrylate/butyl acrylate/(DOL/ECH) macromer is 0.4:0.35:0.25.

The comb copolymer of homo(DOL) macromer and ethyl acrylate is represented by the structure

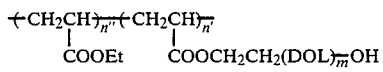 (32)

The comb copolymer of styrenically headed homo(DOL) macromer and styrene is represented by the structure

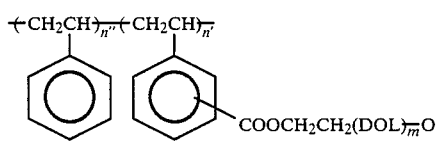 (33)

The comb copolymer of acrylically headed homo(DOL) macromer and styrene is represented by the structure

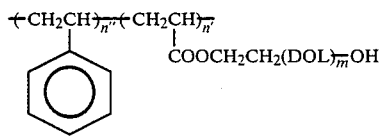 (34)

The foregoing example demonstrates that the macromers of this invention are readily copolymerized with conventional ethylenically unsaturated monomers using standard polymerization techniques. Copolymers of macromers with such monomers are just as easily prepared using solution, suspension, or bulk polymerization procedures and techniques.

Preparation of non-hydrolyzable cyclic formal-siloxane block copolymer

A non-hydrolyzable block copolymer of organosiloxane and DOL was prepared using standard hydrosilation techniques, such as described in U.S. Pat. Nos. 3,798,253 and 4,150,048. Hydrosilylation was carried out under nitrogen in a 3-necked 200 ml flask equipped with a mechanical stirrer, a condenser, and a thermoprobe. Into the flask was added 35 g (0.0268 moles) of the methyl group end-capped macromer of DOL polymer terminated with a 5-norbornen-2-methyl group (Mn=1305) from the preceding example, 28.6 g (0.0049 moles) of methylhydro-dimethylsiloxane liquid copolymer having the average formula:

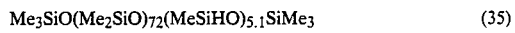Me$_3$SiO(Me$_2$SiO)$_{72}$(MeSiHO)$_{5.1}$SiMe$_3$  (35)

and 50 g of toluene as a solvent. Hydrosilylation was initiated by charging 100 ppm of Pt in the form of chloroplatinic acid and the temperature of the reactor was maintained between 80°–100° C. After two hours, the reaction mixture was neutralized with NaHCO$_3$, and filtered. Toluene was removed by a rotary evaporator under vacuum at 65° C. 56 g of the desired block copolymer represented by the average formula:

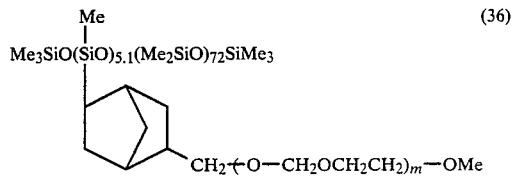 (36)

was obtained, with m having a value of about 16.

The foregoing examples demonstrates that allyl-terminated macromers of this invention are readily reacted with hydrosiloxane polymers to form non-hydrolizable block copolymers of organosiloxane and cyclic formal, using standard hydrosilylation techniques. The block copolymer is composed of a hydrophobic polysiloxane block and a hydrophilic polyformal block, which makes the block copolymer useful as a surfactant and foam stabilizer.

I claim:

1. A process for the manufacture of a polyformal macromer having an ethylenically unsaturated functional group neat one end and a hydroxyl group at the other, comprising, polymerizing (A) a cationically ring-openable cyclic formal having a structure selected from:

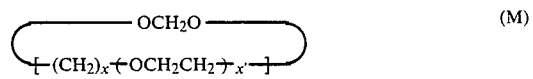 (M)

wherein, x is an integer in the range from 2 to 6;
 x' is in the range from 1 to 3; and, no more than two ring c atoms, other than the 2-carbon atom, may have a single substituent selected from halogen, and lower alkyl, haloalkyl, and alkoxy each $C_1$-$C_5$; said cyclic formal alone, or with a comonomer selected from the group consisting of (i) formaldehyde (ii) 1,3,5-trioxane and (iii) a cationically ring-openable ether; and, (B) a primary or secondary alcohol R—OH having a terminal vinyl group, said alcohol being selected from the group consisting of (a) an acryloyl alcohol wherein the vinyl unsaturation is adjacent a carbonyl group said alcohol having the structure

  (1)

wherein, $R^1$ is H or $C_1$-$C_{20}$ alkyl;

$R^2$ is selected from a saturated group consisting of branched or linear alkylene, haloalkylene, alkoxylene, haloalkoxylene, each $C_1$-$C_{20}$, aralkylene, haloaralkylene, aralkoxylene, and haloaralkoxylene, each $C_7$-$C_{20}$; and, G, when present, is a polyether spacer having a numeral average molecular weight Mn from about 100 to about 10,000, and when absent, is replaced with a bond connecting $R^2$ to OH;

(b) a styrylically unsaturated primary or secondary alcohol wherein the ethylenic unsaturation is adjacent to an aromatic ring, represented by the structure

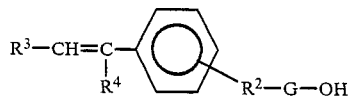  (2)

wherein $R^2$ and G, if either is present, is in an ortho-, meta-, or para-position of the phenyl ring which may be substituted, said position being relative to that of the olefinically unsaturated group; when both $R^2$ and G are absent, they are replaced with a bond connecting the OH group to the ring; and, $R^3$ and $R^4$ are selected from the group consisting of hydrogen, $C_1$-$C_{10}$ alkyl and haloalkyl, and, at least one of $R^3$ and $R^4$ is always H;

(c) an allylically unsaturated primary or secondary alcohol wherein the ethylenic unsaturated primary or secondary alcohol wherein the ethylenic unsaturation is adjacent to a saturated carbon atom, represented by the aliphatic structure

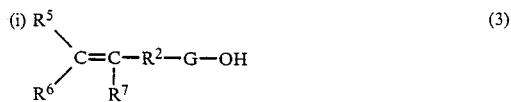  (3)

wherein only G is optionally present; or, by the alicyclic structure

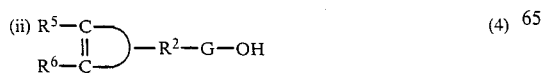  (4)

wherein, the olefin bond is part of the ring which is a single or fused ring structure having from 5 to 10 ring carbon atoms, both $R^2$ and G are optionally present; and, $R^5$, $R^6$ and $R^7$ are independently selected from the group consisting of hydrogen, $C_1$-$C_{20}$ alkyl and haloalkyl, and, $C_6$-$C_{20}$ aryl and aralykyl;

in the presence of an effective amount of (C) a cationic initiator selected from the group consisting of Friedel Crafts acids, relatively strong protic organic and inorganic acids, oxonium salts and stable carbenium ions;

so as to produce a polyformal macromer represented by the structure $$R—(M)_m—OH \qquad (FM)$$

wherein, R represents the residue of said alcohol (B), having a vinyl group,

M represents a repeating unit of a polymeric chain in a homo-, block, or random copolymer of cyclic formal, the chain containing at least 25% by wt of the repeating unit of at least one said cyclic formal which is ring-opened, and, m represent an integer in the range from 2 to about 500.

2. The process of claim 1 wherein said macromer is a random copolymer derived from a first cyclic formal monomer (M1) in combination with a second cyclic formal monomer (M2), so as to have the structure $$R—[(M1)_{m'}—r—(M2)_{m''}]—OH \qquad (7a)$$

wherein, m' and m' are integers each in the range from 1 to about 300 such that m'+m''=m.

3. The process of claim 1 wherein said macromer is a random copolymer derived from a first cyclic formal monomer (M1) in combination with a ring-openable cyclic ether monomer (Et), so as to have the structure $$R—[(M1)_{m'}—r—(Et)_{m''}]—OH \qquad (7b)$$

wherein, m' and m'' are integers each in the range from 1 to about 300 such that m'+m''=m.

4. The process of claim 3 wherein said ring openable ether is selected from the group consisting of (i) an epoxide having the structure

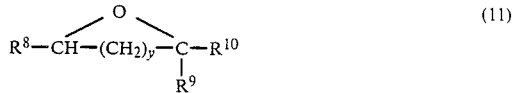  (11)

wherein, y is an integer in the range from 0 to 4, excluding 3, and, $R^8$, $R^9$ and $R^{10}$ are independently selected from the group consisting of hydrogen, $C_1$-$C_{20}$ alkyl and haloalkyl, and, $C_6$-$C_{20}$ aryl (Ar) and aralkyl, and at least one of $R^8$, $R^9$ and $R^{10}$ is hydrogen; and, (ii) an aliphatic or aromatic glycidyl ether having the structure

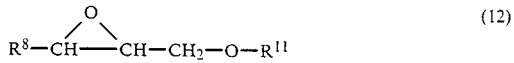  (12)

wherein $R^{11}$ represents a member selected from the group consisting of a alkyl, haloalkyl, alkoxyalkyl, each $C_1$–$C_{20}$, Ar, or substituted aryl (Ar—Q), where Q represents alkyl or haloalkyl each $C_1$–$C_{10}$.

5. The process of claim 1 wherein said macromer is a random copolymer derived from a first cyclic formal monomer (M1) in combination with trioxane (TOX) so as to have the structure $$R-[(M1)_{m'}-r-(TOX)_{m''}]-OH \quad (7c)$$

wherein, TOX represents a ring-opened repeating unit of trioxane, and, m' and m" are integers each in the range from 1 to about 300 such that m'+m"=m.

6. The process of claim 1 wherein said macromer is a formal-formal block copolymer derived from a first cyclic formal monomer (M1) in combination with a second cyclic formal monomer (M2), sequentially, so as to have the structure $$R-(M1)_{m'}-b-(M2)_{m''}-OH \quad (7)$$

wherein, M1 and M2 each represents a formal repeating unit derived from said ring-openable cyclic formal; and, m' and m" are integers each in the range from 1 to about 300 such that m'+m"=m; said block copolymer having substantially uniform molecular weight distribution such that its ratio of Mw/Mn is not above about 5.0.

7. The process of claim 1 wherein said macromer is a formal-ether block copolymer derived from a first cyclic formal monomer (M1) in combination with a cyclic ether (Et), sequentially, so as to have the structure $$R-(M1)_{m'}-b-(Et)_{m''}-OH \quad (7)$$

wherein, M1 and Et represent a formal and ether repeating unit derived from said ring-openable cyclic formal and ether, respectively; and, m' and m" are integers each in the range from 1 to about 300 such that m'+m"=m; said block copolymer having substantially uniform molecular weight distribution such that its ratio of Mw/Mn is not above about 5.0.

8. The process of claim 1 wherein G is present as (PolyEt) and represents a chain of ring-opened cyclic ether repeating units in said macromer, forming a block copolymer of ether-formal represented by the formula $$R'-(polyEt)-b-(M)_{m'}-OH$$

comprising first forming a macromer of polyether $$R'-(PolyEt)-OH$$

from a cyclic ether (Et), then, polymerizing said macromer of polyether with said formal monomer (M), to form said block copolymer of etherformal, wherein, M represents a formal repeating unit derived from said ring-openable cyclic formal;

R'=R—G, and represents the head of a chain derived from an unsaturated alcohol having unsaturation selected from allyl, styryl, or acryloyl; and, m is an integer in the range from 2 to about 300; said block copolymer having substantially uniform molecular weight distribution such that its ratio of Mw/Mn is not above about 5.0.

9. The process of claim 8 wherein said ring openable ether is selected from the group consisting of (i) an epoxides having the structure

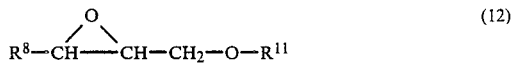

wherein, y is an integer in the range from 0 to 4, excluding 3, and, $R^8$, $R^9$ and $R^{10}$ are independently selected from the group consisting of hydrogen, $C_1$–$C_{20}$ alkyl and haloalkyl, and, $C_6$–$C_{20}$ aryl (Ar) and aralkyl, and at least one of $R^8$, $R^9$ and $R^{10}$ is hydrogen; and, (ii) an aliphatic or aromatic glycidyl ether having the structure $$R^8-CH\underset{\diagdown O \diagup}{-}CH-CH_2-O-R^{11} \quad (12)$$

wherein $R^{11}$ represents a member selected from the group consisting of a alkyl, haloalkyl, alkoxyalkyl, each $C_1$–$C_{20}$, Ar, or substituted aryl (Ar—Q), where Q represents alkyl or haloalkyl each $C_1$–$C_{10}$.

10. The process of claim 9 wherein (PolyEt) is derived from a cationically ring-openable monomer selected from the group consisting of (i) an epoxide selected from ethylene oxide, propylene oxide, 1,2-epoxybutane, 2,3-epoxybutane, 1,2-epoxypentane, 2,3-epoxypentane, 1,2-epoxyhexane, 1,2-epoxydodecane, 1,2-epoxyoctadecane;

(ii) oxetane;

(iii) 1-chloro-2,3-epoxypropane (ECH), 1-bromo-2,3-epoxypropane;

(iv) tetrahydrofuran (THF);

(v) oxepane (OXP);

(vi) an aliphatic or aromatic glycidyl ether selected from methyl glycidyl ether, ethyl glycidyl ether, phenyl glycidyl ether, butyl glycidyl ether; and, (vii) an aliphatic or aromatic glycidyl ester selected from glycidyl acetate, glycidyl chloroacetate, glycidyl butyrate, and glycidyl stearate.

11. The process of claim 1 wherein said cyclic formal (M) has a structure selected from (a) a ring containing two O atoms, including a ring wherein x is an integer in the range from 2 to 4; and, (b) a ring containing plural O atoms, the additional O atoms being part of an ethylene oxide (—CH$_2$—CH$_2$—O—) repeating unit, said plural O atoms ranging from three to six.

12. The process of claim 11 wherein said cyclic formal (M) is selected from the group consisting of 1,3-dioxolane (DOL), 1,3-dioxane (DOX), 1,3-dioxepane (DOP), 1,3,6,9-tetraoxacycloundecane or triethyleneglycolformal (TGF), 1,3,6,11-tetraoxacyclotridecane (DDF), 1,3,6,9,12-pentaoxacyclotetradecane (POC), 1,3,5-trioxetane, 1,3,6-trioxocane and, 1,3,6,9,12,15-hexaoxacycloheptadecane (HOC).

13. The process of claim 12 wherein said G represents a polyether chain derived from a monomer selected from the group consisting of (i) an epoxide selected from ethylene oxide, propylene oxide, 1,2-epoxybutane, 2,3-epoxybutane, 1,2-epoxypentane, 2,3-epoxypentane, 1,2-epoxyhexane, 1,2-epoxydodecane, 1,2-epoxyoctadecane;

(ii) oxetane;

(iii) 1-chloro-2,3-epoxypropane (ECH), 1-bromo-2,3-epoxypropane;

(iv) tetrahydrofuran (THF);
(v) oxepane (OXP);
(vi) an aliphatic or aromatic glycidyl ether selected from methyl glycidyl ether, ethyl glycidyl ether, phenyl glycidyl ether, butyl glycidyl ether; and,
(vii) an aliphatic or aromatic glycidyl ester selected from glycidyl acetate, glycidyl chloroacetate, glycidyl butyrate, and glycidyl stearate.

14. The process of claim 13 wherein G is derived from an essentially linear polyether having Mn in the range from 100 to about 1000.

15. The process of claim 12 wherein said acryloyl alcohol is selected from 2-hydroxyethyl acrylate, 2-hydroxyethyl methacrylate, hydroxypropyl acrylate, hydroxypropyl methacrylate, 4-hydroxybutyl acrylate, 4-hydroxybutyl methacrylate, hydroxymethyl acrylate, hydroxymethyl methacrylate, and, 12-hydroxydecyl acrylate.

16. The process of claim 12 wherein said styrylically unsaturated alcohols is an ortho-, meta- or para-derivative, or mixtures of derivatives selected from the group consisting of hydroxyl styrene, vinyl benzyl alcohol, 2-hydroxyethyl styrene and hydroxypropyl styrene.

17. The process of claim 12 wherein said allylically unsaturated alcohol is selected from the group consisting of
(a) relatively short chain alcohols having from 3 to about 6 carbon atoms selected from the group consisting of allyl alcohol, 2-methyl-2-propene-1-ol, 2-buten-1-ol, and 1-buten-3-ol;
(b) relatively long chain alcohols having from 7 to about 20 carbon atoms selected from the group consisting of 10-undecen-1-ol and oleyl alcohol;
(c) arylalcohols selected from the group consisting of cinnamyl alcohol, and allyl phenol;
(d) monoadducts of a single 1,2-epoxide unit to said allylically unsaturated primary of secondary alcohol, selected the group consisting of 2-hydroxyethyl allyl ether, 2-hydroxy-1-methylethyl allyl ether, and 2-hydroxy-2-methyl ether; and,
(e) alcohols in which the olefinic bond is in a sin or fused ring structure having from 5 to 10 carbon at selected from the group consisting of 2-cyclopenten-1-ol, 2-cyclohexen-1-ol, and 5-norbornene-2-methanol.

18. The of claim 12 wherein said cationic initiator from the group consisting of trialkloxonium salts of tetrafluoroborate, hexaf hexafluoroantimonate, and hexachloroantimonate; and, $SbF_5$, $SbCl_5$, $AsF_3$, $AsF_5$, $PF_5$, $SnCl_4$, and, $BF_3$ etherate.

19. The process of claim 1 wherein said macromer is a formal-formal block copolymer derived from a formal homopolyformal macromer $R—(M)_m—OH$ used as a propagator, so that upon addition of a formal monomer (M2) said block copolymer is formed having the structure

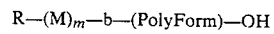

R—(M)$_m$—b—(PolyForm)—OH wherein, M represents a formal repeating unit derived from said ring-openable cyclic formal;
(PolyForm) represents a chain of from 2 to about 300 formal repeating units;
and, m is an integer in the range from 2 to about 300; said block copolymer having substantially uniform molecular weight distribution such that its ratio of Mw/Mn is not above about 5.0.

20. The process of claim 1 wherein said macromer is a formal-ether block copolymer derived from a formal homopolyformal macromer $R—(M)_m—OH$ used as a propagator, so that upon addition of a cyclic ether monomer (Et) said block copolymer is formed, having the structure

R—(M)$_m$—b—(PolyEt)—OH  (10)

wherein, M represents a formal repeating unit derived from said ring-openable cyclic formal;
(PolyEt) is a polyether chain having a mol wt of from about 500 to about 5000; and,
m is an integer in the range from 2 to about 300; said block copolymer having substantially uniform molecular weight distribution such that its ratio of Mw/Mn is not above about 5.0.

21. A process for the manufacture of a copolymer of a polyformal macromer and, an olefinically unsaturated monomer, comprising, polymerizing
(A) said polyformal macromer having the structures $R—(M)_m—OH$ for non-end-capped and, $R—(M)_m—OZ$ for end-capped polyformals, respectively, wherein, M represents a repeating unit of a polymeric chain in a homo-, block, or random copolymer of cyclic formal the chain containing at least 25% by wt of the repeating unit of at least one said cyclic formal which is ring-opened;
Z is the residue of an end-capping unit selected from the group consisting of —R$^5$,

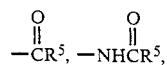

$$-\overset{O}{\underset{\|}{C}}R^5, -\overset{O}{\underset{\|}{N}}HCR^5,$$

—SiR$_3^5$, —CH$_2$CH$_2$CN, —SO$_3$Na, —SO$_3$K, and, —SO$_3$NH$_4$, but R$^5$ cannot be H; and,
R represents the residue of a primary or secondary alcohol R—OH having a terminal vinyl group, said alcohol being selected from the group consisting of
(a) an acryloyl alcohol wherein the vinyl unsaturation is adjacent a carbonyl group as in the structure

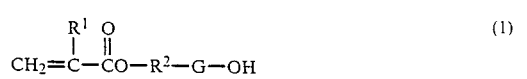

$$CH_2=\overset{R^1}{\underset{|}{C}}-\overset{O}{\underset{\|}{C}}O-R^2-G-OH \quad (1)$$

wherein, R$^1$ is H or C$_1$–C$_{20}$ alkyl, preferably lower C$_1$–C$_5$ alkyl, and most preferably methyl;
R$^2$ is selected from a saturated group consisting of branched or linear alkylene, haloalkylene, alkoxyl, haloalkoxyl, each C$_1$–C$_{20}$, aralkylene, haloaralkylene, aralkoxyl, and haloaralkoxyl, each C$_7$–C$_{20}$; and,
G, when present, is a polyether spacer having a number average molecular weight Mn from about 100 to about 10,000, and when absent, is replaced with a bond;
(b) a styrylically unsaturated primary or secondary alcohol wherein the ethylenic unsaturation is adjacent to an aromatic ring, represented by the structure

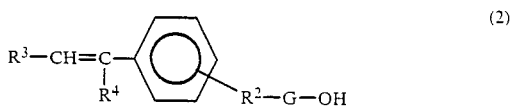

(2)

$$R^3-CH=\underset{R^4}{\underset{|}{C}}-\!\!\!\bigcirc\!\!\!-R^2-G-OH$$

wherein, $R^2$ and G, if either is present, is in an ortho-, meta-, or para-position of the phenyl ring which may be substituted, said position being relative to that of the olefinically unsaturated group; when both $R^6$ and G are absent, they are replaced with a bond connecting the OH group to the ring; and, $R^3$ and $R^4$ are selected from the group consisting of hydrogen, $C_1$-$C_{10}$ alkyl and haloalkyl, and, at least one of $R^3$ and $R^4$ is always H; most preferably, both are H, or, if one is H, the other is $CH_3$;

(c) an allylically unsaturated primary or secondary alcohol wherein the ethylenic unsaturation is adjacent to a saturated carbon atom, represented by the structure (i) 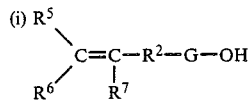 (3)

wherein only G is optionally present; and, (ii)

(ii) 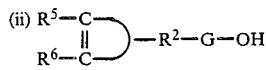 (4)

wherein, both $R^2$ and G are optionally present; that is, when both are absent, they are replaced with a bond directly connecting the OH group to the ring; and, $R^5$, $R^6$ and $R^7$ are independently selected from the group consisting of hydrogen, $C_1$-$C_{20}$ alkyl and haloalkyl, and, $C_6$-$C_{20}$ aryl and aralkyl; with, (B) at least one olefinically unsaturated monomer, in the presence of an effective amount of (C) a free radical generating catalyst, wherein a free radical polymerization is initiated by heat, peroxide, or hydroperoxide decomposition, redox catalysts, or radiation, so as to yield a comb-shaped graft copolymer of formal macromer presented by the structure $[R-(M)_m-OH]_{n'}[M_o]_{n''}$ (27)

$[R-(M)_m-OZ]_{n'}[M_o]_{n''}$ (27')

wherein, $M_o$ represents the olefinically unsaturated monomer;

n' represents an integer in the range from 1 to about $10^4$, and refers to the number of pendant polyformal chains;

n" represents an integer in the range from 1 to about $10^6$, and, m represents an integer in the range from 2 to about 500.

22. The process of claim 21 wherein said olefinically unsaturated monomer is selected from the group consisting of
(i) $C_2$-$C_{12}$ vinyl monomers selected from the group consisting of vinyl chloride, vinyl acetate, acrylonitrile, ethylene, propylene, 4-vinyl pyridine, vinyl pyrrolidone, vinyl benzoic acid, ethyl vinyl ether, salts of vinyl sulfonate, vinylidene chloride, and N-vinyl carbazole:
(ii) $C_8$-$C_{16}$ styryl monomers selected from the group consisting of styrene, 4-chlorostyrene, vinyl toluene, and alpha-methyl styrene;
(iii) alpha,beta-ethylenically unsaturated carboxylic acids, acrylic acid and methacrylic acid, and those having from 3 to 8 carbon atoms, and derivatives thereof selected from the group consisting of esters of $C_1$-$C_{20}$ alcohols said esters selected from the group consisting of ethyl acrylate, ethyl methacrylate, glycidyl acrylate, butyl acrylate, 2-ethylhexyl acrylate; acrylamide and amides of $C_1$-$C_{20}$ amines such as N,N-dimethylacrylamide; and, metal salts such as sodium acrylate; and, the corresponding analogs of methacrylates and methacrylamide; (iv) $C_4$-$C_8$ diene monomers selected from the group consisting of butadiene and isoprene; (v) $C_5$-$C_{10}$ allylically unsaturated monomers selected from the group consisting of allyl acetate, and diallylphthalate; and, (vi) $C_5$-$C_{14}$ cyclic olefins selected from the group consisting of norbornene, dicyclopentadiene, cyclopentene, 1,5-cyclooctadiene and norbornadiene.

23. A process for preparing a non-hydrolyzable formal-siloxane block copolymer of an end-capped formal macromer possessing an allyl head group comprising,
reacting said end-capped formal macromer with an organohydrosiloxane having from 1 to about 30 Si—H bonds and an average mol wt Mn in the range from 300 to 5000 having the formula $R''_3SiO(R''_2SiO)_k(R''SiHO)_{k'}SiR''_3$ (19)

wherein R'' is an unsubstituted or halogen-substituted monovalent $C_1$-$C_5$ hydrocarbon group, k is an integer in the range from 0 to about 300, and k' is an integer in the range from 1 to about 30,
under addition reaction conditions, at a temperature in the range from about 50°–100° C. in the presence of a solvent unreactive with the reactants, and a Pt-containing hydrosilylation catalyst,
so as to produce a formal-silaxane block copolymer of macromer formed with a polyhydrosiloxane, said block copolymer being represented by the formula $A'A''_{k'}$ wherein, A' represents the residue of a polysiloxane block, and,
A'' represents the residue of a polyformal block of end-capped macromer.

24. A polyformal macromer having an ethylenically unsaturated functional group near one end and a hydroxyl group at the other, produced by polymerizing
(A) a cationically ring-openable cyclic formal having a structure selected from:

 (M)

wherein, x is an integer in the range from 2 to 6; x' is in the range from 1 to 3; and, no more than two ring C atoms, other than the 2-carbon atom, may have a single substituent selected from halogen, and lower alkyl, haloalkyl, and alkoxy each $C_1$-$C_5$; said cyclic formal alone, or with a comonomer selected from the group consisting of (i) formaldehyde (ii) 1,3,5-trioxane and (iii) a cationically ring-openable ether; and, (B) a primary or secondary alcohol R—OH having a terminal vinyl group, said alcohol being selected from the group consisting of (a) an acryloyl alcohol wherein the vinyl unsaturation is adjacent a carbonyl group as in the structure

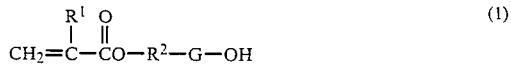

wherein, $R^1$ is H or $C_1$-$C_{20}$ alkyl, preferably lower $C_1$-$C_5$ alkyl;

$R^2$ is selected from a saturated group consisting of branched or linear alkylene, haloalkylene, alkoxylene, haloalkoxylene, each $C_1$-$C_{20}$, aralkylene, haloaralkylene, aralkoxylene, and haloaralkoxylene, each $C_7$-$C_{20}$; and, G, when present, is a polyether spacer having a number average molecular weight Mn from about 100 to about 10,000, and when absent, is replaced with a bond connecting $R^2$ to OH;

(b) a styrylically unsaturated primary or secondary alcohol wherein the ethylenic unsaturation is adjacent to an aromatic ring, represented by the structure

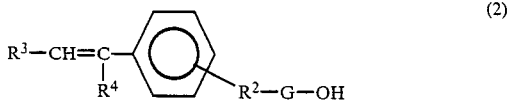

wherein, $R^2$ and G, if either is present, is in an ortho-, meta-, or para-position of the phenyl ring which may be substituted, said position being relative to that of the olefinically unsaturated group; when both $R^2$ and G are absent, they are replaced with a bond connecting the OH group to the ring; and, $R^3$ and $R^4$ are selected from the group consisting of hydrogen, $C_1$-$C_{10}$ alkyl and haloalkyl, and, at least one of $R^3$ and $R^4$ is always H;

(c) an allylically unsaturated primary or secondary alcohol wherein the ethylenic unsaturation is adjacent to a saturated carbon atom, represented by the aliphatic structure

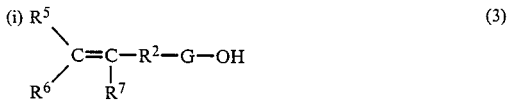

wherein only G is optionally present; and, by the alicyclic structure

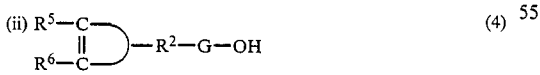

wherein, the olefin bond is part of the ring which is a single or fused ring structure having from 5 to 10 ring carbon atoms, both $R^2$ and G are optionally present; and, $R^5$, $R^6$ and $R^7$ are independently selected from the group consisting of hydrogen, $C_1$-$C_{20}$ alkyl and haloalkyl, and, $C_6$-$C_{20}$ aryl and aralkyl;

in the presence of an effective amount of (C) a cationic initiator selected from the group consisting of Friedel-Crafts acids, relatively strong protic organic and inorganic acids, oxonium salts and stable carbenium ions;

so as to produce a polyformal macromer represented by the structure

wherein, R represents the residue of said alcohol (B), having a vinyl group,

M represents a repeating unit of a polymeric chain in a homo-, block, or random copolymer of cyclic formal, the Z chain containing at least 25% by wt of the repeating unit of at least one said cyclic formal which is ring-opened, and, m represents an integer in the range from 2 to about 500.

25. The polyformal macromer of claim 24 wherein said macromer is a random copolymer of formal-formal, derived from a first cyclic formal monomer (M1) in combination with a second cyclic formal monomer (M2), so as to have the structure

wherein, m' and m'' are integers each in the range from 1 to about 300 such that $m'+m''=m$.

26. The polyformal macromer of claim 24 wherein said macromer is a random copolymer of formal-ether, derived from a first cyclic formal monomer (M1) in combination with a ring-openable cyclic ether monomer (Et), so as to have the structure

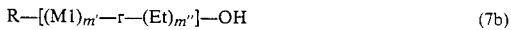

wherein, m' and m'' are integers each in the range from 1 to about 300 such that $m'+m''=m$.

27. The polyformal macromer of claim 26 wherein said ring-openable ether is selected from the group consisting of (i) an epoxide having the structure

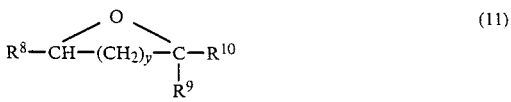

wherein, y is an integer in the range from 0 to 4, excluding 3, and, $R^8$, $R^9$ and $R^{10}$ are independently selected from the group consisting of hydrogen, $C_1$-$C_{20}$ alkyl and haloalkyl, and, $C_6$-$C_{20}$ aryl (Ar) and aralkyl, and at least one of $R^8$, $R^9$ and $R^{10}$ is hydrogen; and, (ii) an aliphatic or aromatic glycidyl ether having the structure

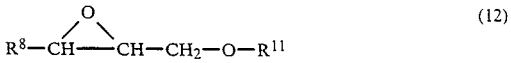

wherein $R^{11}$ represents a member selected from the group consisting of a alkyl, haloalkyl, alkoxyalkyl, each $C_1$-$C_{20}$, Ar, or substituted aryl (Ar—Q), where Q represents alkyl or haloalkyl each $C_1$-$C_{10}$.

28. The polyformal macromer of claim 24 wherein said macromer is a random copolymer derived from a first cyclic formal monomer (M1) in combination with trioxane (TOX) so as to have the structure R—[(M1)$_{m'}$—r—(TOX)$_{m''}$]—OH (7c)

wherein, TOX represents a ring-opened repeating unit of trioxane, and,
    m' and m'' are integers each in the range from 1 to about 300 such that m'+m''=m.

29. The polyformal macromer of claim 24 wherein said macromer is a block copolymer of formal-formal derived from a first cyclic formal monomer (M1) in combination with a second cyclic formal monomer (M2), sequentially, so as to have the structure R—(M1)$_{m'}$—b—(M2)$_{m''}$—OH (7)

wherein, M1 and M2 each represent a formal repeating unit derived from said ring-openable cyclic formal; and,
    m' and m'' are integers each in the range from 1 to about 300 such that m'+m''=m;
    said block copolymer having substantially uniform molecular weight distribution such that its ratio of Mw/Mn is not above about 5.0.

30. The polyformal macromer of claim 24 wherein said macromer is a formal-ether block copolymer derived from a first cyclic formal monomer (M1) in combination with a cyclic ether (Et), sequentially, so as to have the structure R—(M1)$_{m'}$—b—(Et)$_{m''}$—OH (7)

wherein M1 and Et represent a formal and ether repeating unit derived from said ring-openable cyclic formal and ether, respectively; and,
    m' and m'' are integers each in the range from 1 to about 300 such that m'+m''=m;
    said block copolymer having substantially uniform molecular weight distribution such that its ratio of Mw/Mn is not above about 5.0.

31. The polyformal macromer of claim 24 wherein G is present as (PolyEt) and represents a chain of ring-opened cyclic ether repeating units in said macromer, forming a block copolymer of ether-formal represented by the formula R'—(PolyEt)—b—(M)$_{m'}$—OH comprising first forming a macromer of polyether R'—(PolyEt)—OH from a cyclic ether (Et),
    then, polymerizing said macromer of polyether with said formal monomer (M), to form said block copolymer of etherformal,
wherein, M represents a formal repeating unit derived from said ring-openable cyclic formal;
R'=R—G, and represents the head of a chain derived from an unsaturated alcohol having unsaturation selected from allyl, styryl, or acryloyl; and,
m is an integer in the range from 2 to about 300; said block copolymer having substantially uniform molecular weight distribution such that its ratio of Mw/Mn is not above about 5.0.

32. The polyformal macromer of claim 31 wherein said ring openable ether is selected from the group consisting of (i) an epoxide having the structure

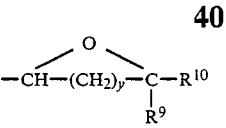
(11)

wherein, y is an integer in the range from 0 to 4, excluding 3, and,
R$^8$, R$^9$ and R$^{10}$ are independently selected from the group consisting of hydrogen, C$_1$-C$_{20}$ alkyl and haloalkyl, and, C$_6$-C$_{20}$ aryl (Ar) and aralkyl, and at least one of R$^8$, R$^9$ and R$^{10}$ is hydrogen; and,
(ii) an aliphatic or aromatic glycidyl ether having the structure

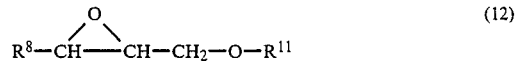
(12)

wherein R$^{11}$ represents a member selected from the group consisting of a alkyl, haloalkyl, alkoxyalkyl, each C$_1$-C$_{20}$, Ar, or substituted aryl (Ar—Q), where Q represents alkyl or haloalkyl each C$_1$-C$_{10}$.

33. The process of claim 32 wherein said G represents a polyether chain derived from a monomer selected from the group consisting of
    (i) an epoxide selected from ethylene oxide, propylene oxide, 1,2-epoxybutane, 2,3-epoxybutane, 1,2-epoxypentane, 2,3-epoxypentane, 1,2-epoxyhexane, 1,2-epoxydodecane, 1,2-epoxyoctadecane;
    (ii) oxetane;
    (iii) 1-chloro-2,3-epoxypropane (ECH), 1-bromo-2,3-epoxypropane;
    (iv) tetrahydrofuran (THF);
    (v) oxepane (OXP);
    (vi) an aliphatic or aromatic glycidyl ether selected from methyl glycidyl ether, ethyl glycidyl ether, phenyl glycidyl ether, butyl glycidyl ether; and,
    (vii) an aliphatic or aromatic glycidyl ester selected from glycidyl acetate, glycidyl chloroacetate, glycidyl butyrate, and glycidyl stearate.

34. The polyformal macromer of claim 24 wherein said cyclic formal (M) has a structure selected from
    (a) a ring containing two O atoms, including a ring wherein x is an integer in the range from 2 to 4; and,
    (b) a ring containing plural O atoms, the additional O atoms being part of an ethylene oxide (—CH$_2$—CH$_2$—O—) repeating unit, said plural O atoms ranging from three to six.

35. The process of claim 34 wherein said cyclic formal (M) is selected from the group consisting of 1,3-dioxolane (DOL), 1,3-dioxane (DOX), 1,3-dioxepane (DOP), 1,3,6,9-tetraoxacycloundecane or triethyleneglycolformal (TGF), 1,3,6,11-tetraoxacyclotridecane (DDF), 1,3,6,9,12-pentaoxacyclotetradecane (POC), 1,3,5-trioxetane, 1,3,6-trioxocane and, 1,3,6,9,12,15-hexaoxacycloheptadecane (HOC).

36. The polyformal macromer of claim 35 wherein said G represents a polyether chain derived from a monomer selected from the group consisting of
    (i) an epoxide selected from ethylene oxide, propylene oxide, 1,2-epoxybutane, 2,3-epoxybutane, cis- and trans-, 1,2-epoxypentane, 2,3-epoxypentane, 1,2-epoxyhexane, 1,2-epoxydodecane, 1,2-epoxyoctadecane;
(ii) oxetane;
(iii) 1-chloro-2,3-epoxypropane (ECH), 1-bromo-2,3-epoxypropane;
(iv) tetrahydrofuran (THF);
(v) oxepane (OXP);
(vi) an aliphatic or aromatic glycidyl ether selected from methyl glycidyl ether, ethyl glycidyl ether, phenyl glycidyl ether, butyl glycidyl ether; and,
(vii) an aliphatic or aromatic glycidyl ester selected from glycidyl acetate, glycidyl chloroacetate, glycidyl butyrate, and glycidyl stearate.

37. The polyformal macromer of claim 36 wherein G is derived from an essentially linear polyether having Mn in the range from 100 to about 1000.

38. The polyformal macromer of claim 35 wherein said acryloyl alcohol is selected from 2-hydroxyethyl acrylate, 2-hydroxyethyl methacrylate, hydroxypropyl acrylate, hydroxypropyl methacrylate, 4-hydroxybutyl acrylate, 4-hydroxybutyl methacrylate, hydroxymethyl acrylate, hydroxymethyl methacrylate, and, 12-hydroxydecyl acrylate.

39. The polyformal macromer of claim 38 wherein (M) is 1,3-dioxolane (DOL), said macromer having an acryloylethyl group at the head of each chain, and the structure $$CH_2=CHCOCH_2CH_2(OCH_2OCH_2CH_2)_{\overline{m}}OH$$

where m=about 6 to 250.

40. The polyformal macromer of claim 35 wherein said styrylically unsaturated alcohols is an ortho-, meta- or para- derivative, or mixtures of derivatives selected from the group consisting of hydroxyl styrene, vinyl benzyl alcohol, 2-hydroxyethyl styrene and hydroxypropyl styrene.

41. The polyformal macromer of claim 40 wherein (M) is 1,3-dioxolane (DOL), said macromer having a styryl group at the head of -each chain, and the structure:

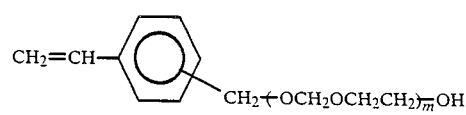

where m=about 6 to 50.

42. The polyformal macromer of claim 35 wherein said allylically unsaturated alcohol is selected from the group consisting of
(a) relatively short chain alcohols having from 3 to about 6 carbon atoms selected from the group consisting of allyl alcohol, 2-methyl-2-propene-1-ol, 2-buten-1-ol, and 1-buten-3-ol;
(b) relatively long chain alcohols having from 7 to about 20 carbon atoms selected from the group consisting of 10-undecen-1-ol and oleyl alcohol;
(c) arylalcohols selected from the group consisting of cinnamyl alcohol, and allyl phenol;
(d) monoadducts of a single 1,2-epoxide unit to said allylically unsaturated primary of secondary alcohol, selected from the group consisting of 2-hydroxyethyl allyl ether, 2-hydroxy-1-methylethyl allyl ether, and 2-hydroxy-2-methylethyl allyl ether; and,
(e) cyclic olefinic alcohols in which the olefinic bond is in a single or fused ring structure having from 5 to 10 carbon atoms, selected from the group consisting of 2-cyclopenten-1-ol, 2-cyclohexen-1-ol, and 5-norbornene-2-methanol.

43. The polyformal macromer of claim 42 wherein (M) is 1,3-dioxolane (DOL), said macromer having an olefinic bond in a cyclic group at the head of each chain, and the structure:

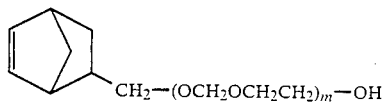

where m=about 6 to 250.

44. The polyformal macromer of claim 42 wherein (M) is 1,3-dioxolane (DOL), said macromer having an allyl group at the head of each chain, in the structure:

$$CH_2=CHCH_2-(OCH_2OCH_2CH_2)_m-OH$$

where m=about 6 to 250.

45. The polyformal macromer of random copolymer of claim 26 of 1,3-dioxolane (DOL) and propylene oxide (PO), said macromer having an acryloyl head group, in which macromer (M1) is a (DOL) repeating unit, and (Et) is a PO repeating unit, and said macromer has the structure:

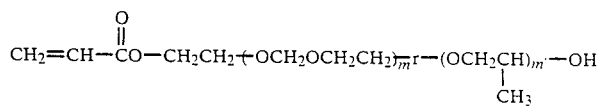

where m=5 to about 50 and m'=3 to about 50.

46. The polyformal macromer of random copolymer of claim 26 in which macromer (M1) is a 1,3-dioxolane (DOL) repeating unit, and (ECH) is a epichlorohydrin repeating unit, and said macromer is selected from the group consisting of:
(i) a DOL/ECH macromer having an acryloyl head group, and the structure:

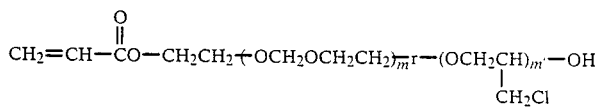

and,
(ii) a DOL/ECH, said macromer having an allyl head group, and the structure:

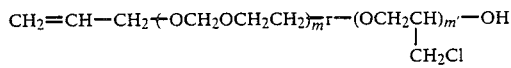

wherein m=3 to about 100 and m'=3 to about 50.

47. The polyformal macromer of block copolymer of claim 31 of ECH/DOL, said macromer having an acryloyl head group, in which macromer (ECH) is an epichlorohydrin repeating unit and (DOL) is a 1,3-dioxolane repeating unit, and said macromer has the structure:

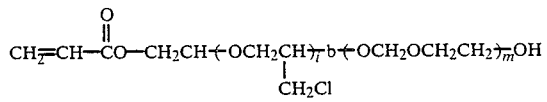

wherein i=2 to about 50, and m=5 to about 100.

48. The polyformal macromer of block copolymer of claim 30 wherein said macromer has an acryloyl head and is a block copolymer derived from 1,3-dioxolane (DOL) in combination with a cyclic ether (Et) repeating unit, sequentially, so as to have the structure

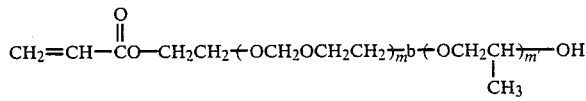

where m=5 to about 50 and m'=3 to about 50.

49. A copolymer of a polyformal macromer, and, an olefinically unsaturated monomer, produced by polymerizing (A) said polyformal having a structure selected from R—(M)$_m$—OH for non-end-capped and, R—(M)$_m$—OZ for end-capped polyformals, respectively, wherein, M represents a repeating unit of a polymeric chain in a homo-, block, or random copolymer of cyclic formal, the chain containing at least 25% by wt of the repeating unit of at least one said cyclic formal which is ring-opened;

Z is the residue of an end-capping unit selected from the group consisting of —R$^5$,

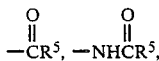

—SiR$_3^5$, —CH$_2$CH$_2$CN, —SO$_3$Na, —SO$_3$K, and, —SO$_3$NH$_4$, except that R$^5$ cannot be H; and, R represents the residue of a primary or secondary alcohol R—OH having a terminal vinyl group, said alcohol being selected from the group consisting of (a) an acryloyl alcohol wherein the vinyl unsaturation is adjacent a carbonyl group as in the structure

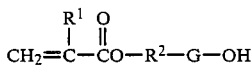

wherein, R$^1$ is H or C$_1$–C$_{20}$ alkyl, preferably lower C$_1$–C$_5$ alkyl, and most preferably methyl;

R$^2$ is selected from a saturated group consisting of branched or linear alkylene, haloalkylene, alkoxyl, haloalkoxyl, each C$_1$–C$_{20}$, aralkylene, haloaralkylene, aralkoxyl, and haloaralkoxyl, each C$_7$–C$_{20}$; and, G, when present, is a polyether spacer having a number average molecular weight Mn from about 100 to about 10,000, and when absent, is replaced with a bond;

(b) a styrylically unsaturated primary or secondary alcohol wherein the ethylenic unsaturation is adjacent to an aromatic ring, represented by the structure

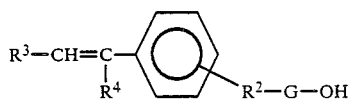

wherein, R$^2$ and G, if either is present, is in an ortho-, meta-, or para-position of the phenyl ring which may be substituted, said position being relative to that of the olefinically unsaturated group; when both R$^6$ and G are absent, they are replaced with a bond connecting the OH group to the ring; and, R$^3$ and R$^4$ are selected from the group consisting of hydrogen, C$_1$–C$_{10}$ alkyl and haloalkyl, and, at least one of R$^3$ and R$^4$ is always H; most preferably, both are H, or, if one is H, the other is CH$_3$;

(c) an allylically unsaturated primary or secondary alcohol wherein the ethylenic unsaturation is adjacent to a saturated carbon atom, represented by the structure

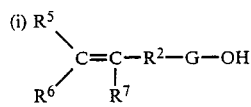

wherein only G is optionally present; and, (ii)

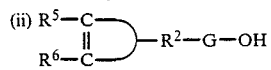

wherein, both R$^2$ and G are optionally present; that is, when both are absent, they are replaced with a bond directly connecting the OH group to the ring; and, R$^5$, R$^6$ and R$^7$ are independently selected from the group consisting of hydrogen, C$_1$–C$_{20}$ alkyl and haloalkyl, and, C$_6$–C$_{20}$ aryl and aralkyl; with, (B) at least one olefinically unsaturated monomer, in the presence of an effective amount of (C) a free radical generating catalyst, wherein a free radical polymerization is initiated by heat, peroxide, or hydroperoxide decomposition, redox catalysts, or radiation, so as to yield a comb-shaped graft copolymer of formal macromer represented by the structure

[R—(M)$_m$—OH]$_{n'}$[M$_o$]$_{n''}$     (27) or,

[R—(M)$_m$—OZ]$_{n'}$[M$_o$]$_{n''}$     (27')

wherein, $M_o$ represents the olefinically unsaturated monomer;

n' represents an integer in the range from 1 to about $10^4$, and refers to the number of pendant polyformal chains;

n" represents an integer in the range from 1 to about $10^6$; and, m represents an integer in the range from 2 to about 500.

50. The polyformal macromer of claim 49 wherein said olefinically unsaturated monomer is selected from the group consisting of
  (i) $C_2$–$C_{12}$ vinyl monomers selected from the group consisting of vinyl chloride, vinyl acetate, acrylonitrile, ethylene, propylene, 4-vinyl pyridine, vinyl pyrrolidone, vinyl benzoic acid, ethyl vinyl ether, salts of vinyl sulfonate, vinylidene chloride, and N-vinyl cabazole;
  (ii) $C_8$–$C_{16}$ styryl monomers selected from the group consisting of styrene, 4-chlorostyrene, vinyl toluene, and alpha-methyl styrene;
  (iii) alpha,beta-ethylenically unsaturated carboxylic acids, acrylic acid and methacrylic acid, and those having from 3 to 8 carbon atoms, and derivatives thereof selected from the group consisting of esters of $C_1$–$C_{20}$ alcohols said esters selected from the group consisting of ethyl acrylate, ethyl methacrylate, glycidyl acrylate, butyl acrylate, 2-ethylhexyl acrylate; acrylamide and amides of $C_1$–$C_{20}$ amines such as N,N-dimethylacrylamide; and, metal salts such as sodium acrylate; and, the corresponding analogs of methacrylates and methacrylamide;
  (iv) $C_4$–$C_8$ diene monomers selected from the group consisting of butadiene and isoprene;
  (v) $C_5$–$C_{10}$ allylically unsaturated monomers selected from the group consisting of allyl acetate, and diallylphthalate; and,
  (vi) $C_5$–$C_{14}$ cyclic olefins selected from the group consisting of norbornene, dicyclopentadiene, cyclopentene, 1,5-cyclooctadiene and norbornadiene.

51. A non-hydrolyzable formal-siloxane block copolymer of an end-capped formal macromer possessing an allyl head group, produced by
reacting said end-capped formal macromer with an organohydrosiloxane having from 1 to about 30 Si—H bonds and an average mol wt Mn in the range from 300 to 5000 having the formula $$R''_3SiO(R''_2SiO)_k(R''SiHO)_{k'}SiR''_3 \qquad (19)$$

wherein R" is an unsubstituted or halogen-substituted monovalent $C_1$–$C_5$ hydrocarbon group, k is an integer in the range from 0 to about 300, and k' is an integer in the range from 1 to about 30, under addition reaction conditions, at a temperature in the range from about 50°–100° C. in the presence of a solvent unreactive with the reactants, and a neutral Pt-containing hydrosilylation catalyst, so as to produce a formal-siloxane block copolymer of macromer formed with a polyhydrosiloxane, said block copolymer being represented by the formula $$A'A''_{k'}$$

wherein, A' represents the residue of a polysiloxane block,

A" represents the residue of a polyformal block of endcapped macromer.

* * * * *

UNITED STATES PATENT AND TRADEMARK OFFICE
CERTIFICATE OF CORRECTION

PATENT NO. : 4,847,332

DATED : July 11, 1989

INVENTOR(S) : Simon Hsiao-Pao Yu

It is certified that error appears in the above-identified patent and that said Letters Patent is hereby corrected as shown below:

Column 28, line 57, "neat" should read ---near---.

Column 28, line 68, "c" should be a capital C.

Column 29, line 25, "numeral" should read ---number---.

Column 29, lines 40-41, "orthio" should read ---ortho---.

Column 29, lines 51-52, "the ethylenic unsaturated primary or secondary alcohol wherein" should not be there.

Column 30, line 34, the second "m' " should be ---m"---.

Column 31, line 68, "epoxides" should be ---epoxide---.

Column 33, line 6, "aromatir" should read ---aromatic---.

Column 33, line 38, "from" should be inserted after "selected".

Column 33, line 47, "trialkloxonium" should read ---trialkyloxonium---.

Column 33, line 48, "hexaf" should read ---hexafluorophosphate---.

UNITED STATES PATENT AND TRADEMARK OFFICE
CERTIFICATE OF CORRECTION

PATENT NO. : 4,847,332

DATED : July 11, 1989

INVENTOR(S) : Simon Hsiao-Pao Yu

It is certified that error appears in the above-identified patent and that said Letters Patent is hereby corrected as shown below:

Column 41, line 42, there should not be a hyphen before "each".

Signed and Sealed this

Thirtieth Day of June, 1992

*Attest:*

DOUGLAS B. COMER

*Attesting Officer*      *Acting Commissioner of Patents and Trademarks*